(12) United States Patent
Kovac et al.

(10) Patent No.: US 10,589,858 B2
(45) Date of Patent: Mar. 17, 2020

(54) METHOD OF USING A DEVICE CAPABLE OF CONTROLLED FLIGHT

(71) Applicant: Imperial Innovations Limited, London (GB)

(72) Inventors: Mirko Kovac, London (GB); Talib Muhammad Talib Alhinai, London (GB)

(73) Assignee: Imperial College Innovations Limited (GB)

( * ) Notice: Subject to any disclaimer, the term of this patent is extended or adjusted under 35 U.S.C. 154(b) by 0 days.

(21) Appl. No.: 15/309,351

(22) PCT Filed: May 7, 2015

(86) PCT No.: PCT/EP2015/060128
§ 371 (c)(1),
(2) Date: Mar. 15, 2017

(87) PCT Pub. No.: WO2015/169931
PCT Pub. Date: Nov. 12, 2015

(65) Prior Publication Data
US 2017/0113799 A1    Apr. 27, 2017

(30) Foreign Application Priority Data

May 7, 2014    (GB) .................................. 1408097.2

(51) Int. Cl.
*B32B 41/00*      (2006.01)
*B64C 39/02*      (2006.01)
(Continued)

(52) U.S. Cl.
CPC ............ *B64C 39/024* (2013.01); *B64C 25/00* (2013.01); *B64C 39/02* (2013.01); *F03D 1/0675* (2013.01);
(Continued)

(58) Field of Classification Search
CPC . B64C 39/024; B64C 25/00; B64C 2201/146; B64C 2201/042;
(Continued)

(56) References Cited

U.S. PATENT DOCUMENTS

| 4,453,675 A | 6/1984 | Kodadek et al. |
| 8,167,234 B1 | 5/2012 | Moore |

(Continued)

FOREIGN PATENT DOCUMENTS

| EP | 2465582 A2 | 6/2012 |
| ES | 8502599 A1 | 4/1985 |

(Continued)

OTHER PUBLICATIONS

Gibson et al., "Additive manufacturing technologies: rapid prototyping to direct digital manufacturing", Springer, 2010.
(Continued)

*Primary Examiner* — Michael N Orlando
*Assistant Examiner* — Joshel Rivera
(74) *Attorney, Agent, or Firm* — Andrus Intellectual Property Law, LLP

(57) ABSTRACT

There is provided a method of using a device capable of controlled flight in a surrounding environment, the device comprising: lifting means for providing lift to the device; object-retaining means for holding an object to be affixed to a target site; and a dispensing assembly for dispensing an adhesive, wherein the method comprises: controlling the lifting means so as to controllably fly the device in the surrounding environment; and using the device to affix an object held by the object-retaining means to a target site in the surrounding environment by dispensing an adhesive from the dispensing assembly. Thus, an aerial device, for example a robotic device, may be used to fly to a desired
(Continued)

location and affix an object at the desired location, by dispensing, ejecting or otherwise applying an adhesive.

21 Claims, 16 Drawing Sheets

(51) Int. Cl.
    *F03D 1/06*         (2006.01)
    *F03D 80/50*       (2016.01)
    *B64C 25/00*       (2006.01)
    *G05D 1/10*        (2006.01)

(52) U.S. Cl.
    CPC ............. *F03D 80/50* (2016.05); *G05D 1/104* (2013.01); *B64C 2201/027* (2013.01); *B64C 2201/042* (2013.01); *B64C 2201/066* (2013.01); *B64C 2201/08* (2013.01); *B64C 2201/108* (2013.01); *B64C 2201/12* (2013.01); *B64C 2201/146* (2013.01); *B64C 2201/18* (2013.01); *B64D 2211/00* (2013.01); *Y02E 10/721* (2013.01)

(58) Field of Classification Search
    CPC ........ B64C 2201/066; B64C 2201/108; B64C 2201/12; G05D 1/104; B64D 2211/00
    USPC ........ 244/110 F, 110 C, 110 G, 110 R, 114 R
    See application file for complete search history.

(56) References Cited

U.S. PATENT DOCUMENTS

| | | | | |
|---|---|---|---|---|
| 2008/0156932 | A1* | 7/2008 | McGeer | B64C 39/024 244/110 C |
| 2013/0134254 | A1* | 5/2013 | Moore | B64D 1/16 244/17.11 |
| 2013/0292039 | A1 | 11/2013 | Peters et al. | |
| 2015/0158587 | A1* | 6/2015 | Patrick | B64C 39/024 244/137.4 |

FOREIGN PATENT DOCUMENTS

| | | |
|---|---|---|
| WO | 2002076826 A1 | 10/2002 |
| WO | 2005042342 A2 | 5/2005 |
| WO | 2011066373 A1 | 6/2011 |
| WO | 2013171735 A1 | 11/2013 |
| WO | 2014160589 A1 | 10/2014 |

OTHER PUBLICATIONS

Perez, "Analysis of the surface roughness and dimensional accuracy capability of fused deposition modelling processes", International Journal of Production Research, 2012,40(12):2865-2881.
Lupashin et al., "A simple learning strategy for high-speed quadrocopter multi-flips", In IEEE International Conference on Robotics and Automation (ICRA), 2010,1642-1648.
Kushleyev et al., "Towards a swarm of agile micro quadrotors", In Robotics: Science and Systems, 2012.
Schmid et al., "Stereo vision based indoor/outdoor navigation for flying robots", In IEEE/RSJ International Conference on Intelligent Robots and Systems (IROS), 2013,3955-3962.
Gurdan et al., "Energy-efficient autonomous fourrotor flying robot controlled at 1 khz", In IEEE International Conference on Robotics and Automation, 2007, 361-366.
Michael et al., "The grasp multiple micro-uav testbed", Robotics & Automation Magazine, IEEE, 2010,17(3):56-65.
Hehn et al., "Quadrocopter trajectory generation and control", In IFAC World Congress, 2011, 1485-1491.
Schmid et al., "Towards Autonomous MAV Exploration in Cluttered Indoor and Outdoor Environments", RSS 2013 Workshop on Resource-Efficient Integration of Perception, Control and Navigation for Micro Air Vehicles (MAVs), 2013.
Richter et al., "Polynomial trajectory planning for quadrotor flight", In International Conference on Robotics and Automation, 2013.
Turpin et al., "Goal assignment and trajectory planning for large teams of aerial robots", In Proc. Robotics: Science and Systems, 2013.
Lim et al., "Developments in construction scale additive manufacturing processes", Automation in Construction, 2012, 21:262-268.
Napp et al., "Materials and mechanisms for amorphous robotic construction", In IEEE/RSJ International Conference on Intelligent Robots and Systems (IROS), 2012,4879-4885.
Werfel et al., "Designing collective behavior in a termite-inspired robot construction team", Science Magazine, 2014, 343:754-758.
Brodbeck et al., "Robotic body extension based on hot melt adhesives", In Robotics and Automation (ICRA), 2012 IEEE International Conference, 4322-4327.
Wang et al., "A dragline-forming mobile robot inspired by spiders", Bioinspiration and Biomimetics, 2014, (1):016006.
Lindsey et al., "Construction of cubic structures with quadrotor teams", Robotics: Science and Systems, 2011.
Willmann et al., "Aerial robotic construction towards a new field of architectural research", International journal of architectural computing, 2012, 10(3):439-460.
Sa et al., "System identification, estimation and control for a cost effective open-source quadcopter", In IEEE International Conference on Robotics and Automation (ICRA), 2012, 2202-2209.
Hunt et al., "3D printing with flying robots", IEEE International Conference on Robotics and Automation (ICRA), 2014, 4493-4499.
Vicon Vantage Intelligence in Motion, by Vicon, website accessible at https://www.vicon.com/products/camera-systems/vantage, visited on Feb. 7, 2017.
Building Tensile Structures with Flying Machines, published by Federico Augugliaro, Oct. 31, 2013, website accessible at hhttps://www.youtube.com/watch?v=_T0J5PB2av8, visited on Feb. 7, 2017.
SpiderFab by Tethers Unlimited from the AIAA Space 2013 conference, website accessible at http://www.tethers.com/SpiderFab.html, visited on Feb. 7, 2017.
Construction with Quadrotor Teams, by Quentin et al., GRASP LAB, University of Pennsylvania, Jan. 31, 2011, website accessible at http://www.youtube.com/watch?feature=player_embedded&v=W18Z3UnnS_0, visited on Feb. 7, 2017.
Flying robots, the builders of tomorrow, by Reuters on Dec. 2, 2011, website accessible at https://www.youtube.com/watch?NR=1&v=xvN9Ri1GmuY&feature=fvwp, visited on Feb. 7, 2017.
Construction with Quadrotor Teams, by Quentin et al., GRASP LAB, University of Pennsylvania, 2013, website accessible at http://web.archive.org/web/20140710040603/http://www.upenn.edu/spotlights/quadrotors, visited on Feb. 7, 2017.
Robotic spider weaves web at MIT Media Lab, by MIT Media Lab's Mediated Matter group, website accessible at http://video.mit.edu/watch/robotic-spider-weaves-web-at-mit-media-lab-11217/, visited on Feb. 7, 2017.
Flying Machine Enabled Construction, website accessible at http://web.archive.org/web/20140224005740/http://www.idsc.ethz.ch/Research_DAndrea/Archives/Flying_Machine_Enabled_Construction, visited on Feb. 7, 2017.
Drone lays foam eggs, by Rowan Hooper Apr. 30, 2014, website accessible at https://vine.co/v/MrWATZjetFx, visited on Feb. 7, 2017.
3DR, website accessible at https://store.3dr.com/, visited on Feb. 7, 2017.
Flying 3D printer could seal off nuclear waste, by Rowan Hooper May 10, 2014, website accessible at https://www.newscientist.com/article/mg22229683-900-flying-3d-printer-could-seal-off-nuclear-waste/#.U2ouYV67nRo, visited on Feb. 7, 2017.
International Search Report and Written Opinion issued in corresponding International Application No. PCT/EP2015/060128, dated Jan. 22, 2016.

\* cited by examiner

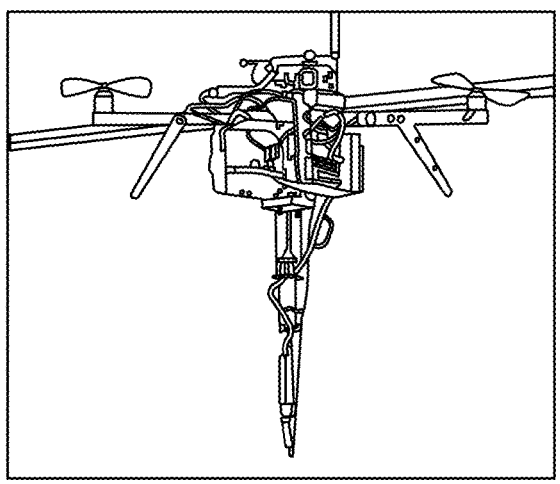
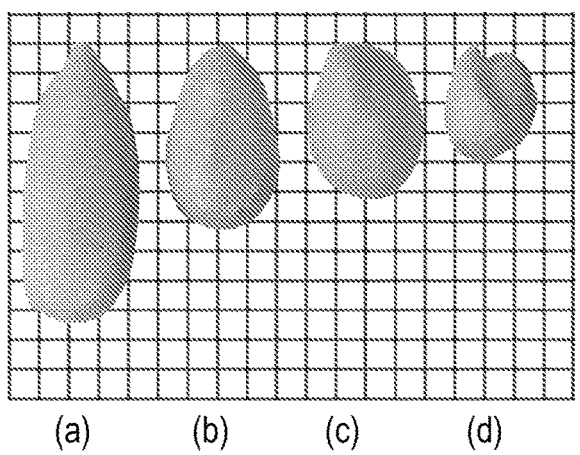
FIG. 14
FIG. 15
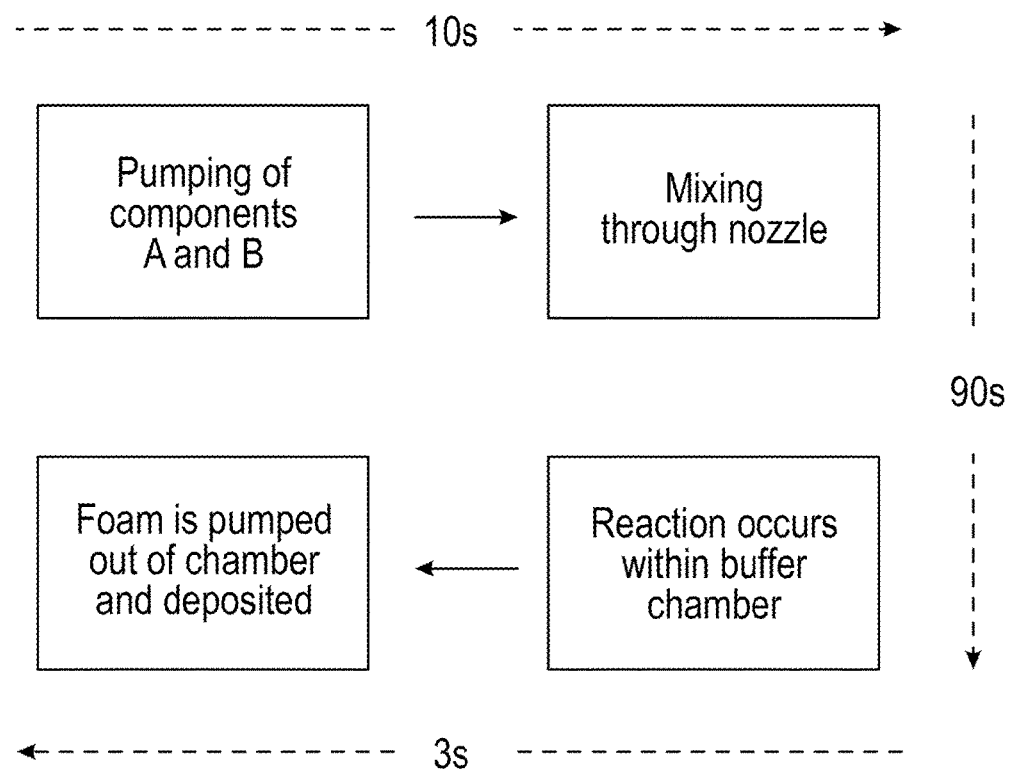
FIG. 16

(a1)  (a2)  (a3)  (a4)

(b1)  (b2)  (b3)  (b4)

(c1)  (c2)  (c3)

METHOD OF USING A DEVICE CAPABLE OF CONTROLLED FLIGHT

CROSS-REFERENCE TO RELATED APPLICATIONS

This application is the U.S. national stage application of International Application PCT/EP2015/060128, filed May 7, 2015, which international application was published on Nov. 12, 2015, as International Publication WO2015/169931 in the English language. The international application is incorporated herein by reference, in entirety. The international application claims priority to GB Patent Application No. 1408097.2, filed May 7, 2014, which is incorporated herein by reference, in entirety.

FIELD OF THE INVENTION

The present invention relates to methods of using a device capable of controlled flight, and to such a device. In one embodiment, the invention relates to a method of affixing an object to a target site. The invention further relates to a dispensing assembly that may be used with the device.

BACKGROUND TO THE INVENTION

Robots are often used in the construction and architecture industries for fabrication purposes. Since the 1980s, mobile robots have been used to carry out assembly and construction tasks such as welding, painting, bricklaying and decommissioning. However, traditional ground construction robots such as gantry and industrial robots are often constrained by predefined working areas that hinder their scale of action, and that limit the size and scope of pieces of work they may act upon.

The use of flying robots for carrying out construction tasks is a solution that overcomes some of the main limitations of predefined working areas faced by ground robots. Some of the benefits that flying robots bring over traditional ground robots include:
- the ability to operate dynamically in space, especially in areas difficult to access, such as those at high altitude;
- the ability to work in co-operation with other flying robots to accelerate the construction process;
- the ability to more precisely lay out and assemble materials for construction;
- the ability to eliminate dangers for human workers, especially those involved in roof work or other high-altitude work, and the ability to safely navigate dangerous terrains.

Current aerial robotic construction methods involve the building of structures using large bricks or magnetic beams with GPS-enabled flying robots, as illustrated by Kumar et al. at the University of Pennsylvania's GRASP Lab.

Clearly, whilst flying robots bring many benefits to the construction and related industries, there nonetheless remains significant scope for areas of development and improvement. For example, in the existing prior art, the flight path of the robot must generally be established using GPS-type techniques, or else the robot must be remotely controlled, and is therefore less autonomous. In addition, the range and type of structures that may be built are limited.

The present invention seeks provide new and improved uses of devices, especially robotic aerial devices, capable of sustained and controlled flight, that address these and other deficiencies encountered in the prior art.

SUMMARY OF THE INVENTION

According to a first aspect of the invention, there is provided a method of using a device capable of controlled flight in a surrounding environment. The device comprises lifting means for providing lift to the device, object-retaining means for holding an object to be affixed to a target site, and a dispensing assembly for dispensing an adhesive. The method comprises controlling the lifting means so as to controllably fly the device in the surrounding environment. The method further comprises using the device to affix an object held by the object-retaining means to a target site in the surrounding environment by dispensing an adhesive from the dispensing assembly.

The device may be a robotic device, for example one that responds to an input with a corresponding output. The device may also be a drone-type device. Throughout this disclosure, the term "robotic" should not be construed as limiting. The lifting means may comprise one or more propellers or any other mechanism capable of providing sufficient lift to allow the device to fly. The object-retaining means may comprise various different forms. In some embodiments, the object-retaining means may be on-board storage such as a payload of the device. Thus, the device may store the object in the payload during flight. In other embodiments, the object-retaining means may be a component designed to manipulate, grip or otherwise handle an object. For example, as discussed below in more detail, the object-retaining means may be actively arranged to pick up an object and hold onto it during flight. The target site may comprise any surface in the surrounding environment on which an object may be affixed.

Thus, an aerial device, for example a robotic device, may be used to fly to a desired location and affix an object at the desired location, by dispensing, ejecting or otherwise applying an adhesive. The adhesive may be dispensed or ejected onto the target site, following which the object may then be affixed to the target site. Alternatively, the adhesive may be combined with the object during flight, prior to arrival at the target site. Even still, the object may first be placed on the target site and the adhesive applied subsequently.

The device may be remote-controlled by a user. The affixing step may take place whilst the device is hovering over the target site. As such hovering requires careful control of the device, in some embodiments the device may land adjacent the target site prior to carrying out the affixing step, for example prior to dispensing the adhesive onto the target site.

The possible applications of an aerial robotic device that may affix objects to target sites in a controlled manner are far reaching. In the aviation field, the device may be used to repair an aircraft's damaged wings, fuselage, even whilst the aircraft is in mid-flight. Due to size of aircraft, maintenance is strenuous and troublesome for human workers, and devices according to the invention may therefore provide for a more economic and safer means of allowing repair. The device may be used in disaster management scenarios, and for example may be used to hold together or re-attach damaged electrical power cables following natural disasters. In the civil engineering field, the device may be used to build structures for high-rise buildings, build structures over water, deploy construction safety netting, carry out repair in hard-to-access areas, such as on wind turbines, and perform other general construction work.

The device may further comprise sensor means for generating sensor data of the surrounding environment. Controllably flying the device may further comprise processing the sensor data of the surrounding environment. The sensor means may include one or more various types of sensors, such as cameras, lasers, scanning means, sonar, imaging means, or any other means arranged to measure data relating to the surrounding environment, such that the device may autonomously navigate through the environment. If one or more cameras are used, the cameras may be arranged to image the surrounding environment. Image data may be generated from the images and processed using an on-board processor in order to assist the device in executing controlled flight in the environment.

Thus, the device may advantageously be capable of vision-based autonomous flight, without the need for GPS or any other form of localisation system, thus increasing the flexibility of deployment. For example, the sensor means may comprise on-board cameras and may use autonomous navigation software to navigate within the surrounding environment. Software packages that permit such vision-based navigation may include SLAM (Simultaneous Localisation and Mapping) or PTAM (Parallel Tracking and Mapping). In some embodiments, autonomous navigation of the device may be assisted by remote control.

The object may be a flexible elongate member stored on the device, and in particular may be a string-like member, such as a filament, fibre, thread, rope, or other string-like member. The flexible elongate member may be conductive. Thus, the device may be used to effectively build or construct conductive lines between different target sites. For example, by affixing an end of the string-like member to a first target site, and by then flying to a second target site and fixing another portion of the string-like member to the second target site, the device may build a conductive path between the two target sites. This may be used in various applications, for example in order to build a large-scale circuit by laying down power lines.

One end of the flexible elongate member may be fixed to the device, and the affixing step may comprise affixing a portion of the flexible elongate member to the target site using the dispensed adhesive. Thus, the elongate flexible member may follow the flight path of the device as it flies from one target site to the next.

The method may further comprise repeating the affixing step so as to create a web-like structure. Thus, in a string-based aerial robotic construction process, the device may be arranged to bond the string to a target surface before flying off and stretching the string to a subsequent surface on which the string is to be bonded again. By repeating this process over and over again, a flying robot may effectively create a web-like structure. Each node of the web may be a different point of fixation of the elongate flexible member to a target site. The web may be used as a landing platform for the device. In one particular example, an epoxy adhesive with Kevlar strings is used.

Advantageously, string-like members may be used with adhesives on almost any surface and anywhere, without the restrictions associated with known methods of construction using flying robots. In some embodiments, the string-like member may be soaked or immersed in a chemical that changes the stiffness of the string, or that may cause the string adhere to other objects through physical or chemical bonding.

The affixing step may comprise first applying at least some of the adhesive to the target site and subsequently affixing the object to the target site. Thus, the affixing of the objet to the target site may be a two-step process, in which first the adhesive (or a portion thereof) is dispensed on or otherwise applied to the target site, and following which the object may be brought into contact with the adhesive for bonding.

Instead, the affixing step may comprise first applying at least some of the adhesive to the object and subsequently affixing the object to the target site. Thus, the adhesive may be joined to the object mid-flight, and before application to the target site. Of course, the timing and other conditions of the application of the adhesive to the object should be controlled to prevent the adhesive from curing before being applied to the target site.

The object may be immersed in the adhesive prior to being affixed to the target site. Where the object is a string-like member, the string-like member may be soaked, immersed or otherwise impregnated in an ultraviolet glue or adhesive. Such an adhesive begins curing upon exposure to UV radiation. The device may comprise an on-board UV radiation source that is activated during dispensing of the adhesive, to trigger curing. Alternatively or in addition, curing may be triggered by simply deploying or dispensing the adhesive onto a target site exposed to the sun's radiation, or other suitable UV radiation.

The adhesive may comprise a cyanoacrylate, a two-part epoxy, or a two-part ceramic. These are merely a few examples of the types of adhesives that may be used.

The method may further comprise repeating the affixing step at least once. A subsequent affixing step may comprise affixing a further object held in the object-retaining means to an object already affixed to the target site. Thus, the device may be arranged to accurately and efficiently build a structure composed of objects that have been affixed to various target sites. A target site may be a site on an object that has already been affixed using the above-described method.

The object-retaining means may be arranged is pick up an object, and the method may further comprise using the object-retaining means to pick up an object Advantageously, therefore, the device may effectively build a structure entirely of objects found and picked up the surrounding environment. For example, the device may use the sensor means to generate sensor data of the environment. By processing the sensor using vision-based software algorithms known in the art, the device may identify and locate objects and pick them up using the object-retaining means. The objects may then be affixed to target sites and/or to each other in order to build a structure.

The target site may be identified by processing the generated sensor data. Again, vision-based algorithms may be used to allow the device to autonomously locate and identify a target site in the surrounding environment. In one particular scenario for example, the device use its on-board sensor means to locate and identify areas or sites in need of repair on a structure, for example a wind turbine. The same device may then commence repair of the damaged site by affixing a web-like structure to the damaged area, using the above-described method.

In a further aspect of the invention, there is provided a method of using a device capable of controlled flight in a surrounding environment. The device comprises lifting means for providing lift to the device, and a dispensing assembly for dispensing a curable substance. The method comprises controlling the lifting means so as to controllably fly the device in the surrounding environment. The method further comprises controlling the dispensing assembly to dispense at least some of the curable substance on a target site in the surrounding environment.

The curable substance may be any substance arranged to cure when in the presence of heat, pressure, etc. Curing should be construed broadly, and may be any transformation of a liquid or powder into a solid element. The curable substance may be in particular a curable foam such as polyurethane foam. The curable substance may comprise spray-on fabric, or other spray-on type substances. The curable substance may comprise an adhesive or may have adhesive-like properties.

The curable substance or foam may be dispensed or applied to a web-like structure as described above. Thus, the web and the curable substance may be used together to form a composite material. By alternately creating a web-like structure (using adhesive and a string-like member as described above), and a layer of curable substance such as a curable foam, a composite structure may be created.

As described above, the device may further comprise sensor means for generating sensor data of the surrounding environment. Controllably flying the device may comprise processing the sensor data of the surrounding environment.

The method may further comprise flying the device into contact with the dispensed curable substance prior to full curing, and waiting for the dispensed curable substance to fully cure such that the cured substance is fixed to the device.

In such a case, the target site is typically an object that may be picked up by the device. The device may therefore be arranged to autonomously identify an object in an environment, apply a curable substance to the object, and fixedly attach itself to the object.

This method has particular applications in warzones. For example, the device may first identify a hazardous object in its surrounding environment, such as an IED (improvised explosive device). Identification and localisation of the object may be assisted remotely by a user inputting commands to the device. The device may then apply a portion of the curable substance over the IED. Before the substance fully cures, the device may fly into contact with the substance, following which the substance will harden and effectively fix itself to the object. The device may therefore effectively bind itself to the IED, and may pick up the IED as a result and remove it for deactivation.

The dispensing step may be used as part of a three-dimensional printing process. One or more devices may be used to repeatedly apply layers of a curable substance to one or more target sites. Subsequent layers may be applied to layers that have already cured, thereby allowing the aerial robots to create a 3D layered structure as in a 3D printing process.

In a further aspect of the invention, there is provided a dispensing assembly for use with a device capable of controlled flight. The dispensing assembly comprises a first reservoir for containing a first substance, a second reservoir for containing a second substance, a mixing chamber in fluid communication with the first and second reservoirs, and an actuator arranged to cause controlled amounts of the first and second substances to flow from the first and second reservoirs to the mixing chamber. The dispensing assembly further comprises pumping means arranged to pump the contents of the mixing chamber out of the dispensing assembly.

The dispensing assembly may be used in conjunction with a device to store one or more chemicals that, when combined, produce an adhesive or a curable substance such as a curable foam.

The actuator may comprise a motor arranged when activated to displace a plunger in each of the first and second reservoirs. The plungers may be part of a single component comprising two plunger portions. Each plunger portion may be arranged to translate along a respective container when activated.

Actuation of the motor may be arranged to cause rotation of a lead screw coupled to the plungers.

The dispensing assembly may further comprise a reaction chamber in fluid communication with the mixing chamber, thereby allowing the contents of the mixing chamber to flow from the mixing chamber to the reaction chamber following activation of the actuator. The reaction chamber may therefore act as a buffer chamber, in other words a chamber in which the mixture of the first and second chemicals may be retained prior to dispensing from the assembly, in order allow the mixture to properly react.

The dispensing assembly may further comprise a valve arranged when closed to prevent dispensing of the contents from the dispensing assembly, and further arranged to open after a predetermined amount time has expired after activation of the actuator.

Advantageously, the dispensing assembly may be used with a device capable of controlled flight (as described above), to safely store one or more chemicals that may be combined to form an adhesive or other curable substance. When the adhesive is required to be applied, the on-board processor of the device may activate the plunger, which may trigger the mixture of the two chemicals to begin formation of the adhesive or other curable substance. Triggering may also be done remotely.

In a further aspect of the invention, there is provided a method of using an aerial device capable of controlled flight. The aerial device comprises: a lift generator for providing lift to the aerial device; and a suspension device for suspending the aerial device from an object. The method comprises:

controlling the lift generator so as to controllably fly the aerial device relative to a supporting structure; and using the suspension device to suspend the aerial device from the supporting structure.

Thus, a device may perch or suspend from an object or similar supporting structure. This can be useful for a variety of reasons, as discussed throughout this disclosure. For example, whilst perching the aerial device may dispense a curable substance from an on-board dispensing assembly, as discussed above. The suspension device may take various different forms. For example, the suspension device may be any device capable of allowing the aerial device to suspend from an object, such as a robotic arm which may hook onto or otherwise latch onto the object. In other embodiments the suspension device may be a device configured to deploy a flexible member, this member being used to suspend the aerial device from the object.

In particular, the suspension device may be arranged to retractably deploy an elongate flexible member by a controllable length, for suspending the aerial device from the supporting structure using the elongate flexible member. Thus, the suspension device may controllably deploy or extend the elongate flexible member by a controllable amount, and may equally retract the elongate flexible member by a controllable amount.

Retractably deploying the elongate flexible member may comprise spooling and/or de-spooling the elongate flexible member. The elongate flexible member may be a string-like member.

The elongate flexible member may be attachable to the supporting structure. For example, the elongate flexible member may be adhesive and may be configured to stick or adhere to the supporting structure. The elongate flexible member may comprise a hooking member for attaching the elongate flexible member to the supporting structure.

Using the suspension device may comprise freely suspending the aerial device from the supporting structure. Thus, the lift generator of the aerial device may be deactivated once the aerial device is suspended from the supporting structure, for example to allow the aerial device to recharge its power supply if necessary.

The supporting structure may comprise an elongate member. For example, the supporting structure may be a string-like member put in place by other aerial devices.

The method may further comprise operating at least one of the lift generator and the suspension device so as to release the aerial device from its suspension from the supporting structure. For example, the method may further comprise controlling the lift generator so as to controllably fly the aerial device relative to the supporting structure, thereby releasing the suspension device from the supporting structure. Thus, the aerial device may be controllably flown so as to move the suspension device to such a position that the suspension device disengages from the supporting structure, thereby freeing the aerial device from its suspension to the supporting structure.

The suspension device may be arranged to retractably deploy an elongate flexible member by a controllable length, for suspending the aerial device from the supporting structure using the elongate flexible member, and the method may further comprises deploying the full length of the elongate flexible member such that the aerial device detaches from the elongate flexible member, thereby releasing the aerial device from its suspension from the supporting structure. For example, the elongate flexible member may be completely de-spooled from the aerial device, allowing the aerial device to be disengaged from the elongate flexible member and in turn the supporting structure.

The suspension device may be arranged to retractably deploy an elongate flexible member by a controllable length, for suspending the aerial device from the supporting structure using the elongate flexible member, and the method may further comprise severing the elongate flexible member so as to release the aerial device from its suspension from the supporting structure. For example, the elongate flexible member may be fed through a pair of sharpened edges of material (such as a pair of scissors) and a servo motor (or similar) may be used to actuate one of the pivots of the sharp material against the other, to shear the elongate flexible member and secure release of the aerial device. Alternatively, the elongate flexible member may be released with a nichrome burn wire mechanism. The elongate flexible member may be fed through a ring of nichrome wire material secured at the release point of the spool. When required, a controlled current may be sent through the wire that in turn heats up the wire and burns through the elongate flexible member, releasing the aerial device from the elongate flexible member.

The suspension device may be arranged to retractably deploy an elongate flexible member by a controllable length, for suspending the aerial device from the supporting structure using the elongate flexible member, and the method may further comprise controlling, during suspension of the aerial device from the supporting structure, a vertical distance between the aerial device and the supporting structure by controlling the length of the elongate flexible member deployed by the suspension device. For example, by alternately deploying/retracting the elongate flexible member whilst suspended, the aerial device may control its vertical distance relative to the supporting structure.

The aerial device may further comprise one or more sensors for generating sensor data of a surrounding environment in which the aerial device is controllably flown. Controllably flying the aerial device may comprise processing the sensor data of the surrounding environment. The one or more sensors may comprise at least one camera.

The lift generator may comprise at least one propeller.

The aerial device may further comprise an energy storage device, such as a battery. The method may further comprise recharging the energy storage device. Recharging may comprise using one or more solar panels of the aerial device.

In a further aspect of the invention there is provided an aerial device capable of controlled flight. The aerial device comprises: a lift generator for providing lift to the aerial device; a suspension device for suspending the aerial device from an object; and a processor configured to carry out any of the above steps.

The aerial device may further comprise one or more sensors for generating sensor data of a surrounding environment in which the aerial device is controllably flown. The aerial device may further comprise an energy storage device for providing power to the aerial device.

In a further aspect of the invention there is provided a method of synchronising the trajectories of a plurality of aerial devices. Each aerial device comprises a lift generator for providing lift to the aerial device. The method comprises controlling the lift generator of each aerial device so as to controllably fly each aerial device along a respective trajectory in a flying space. Each trajectory defines a path to be taken by the aerial device in the flying space as a function of time. The method further comprises dividing each path into a plurality of respective synchronisation points; determining at each synchronisation point whether any of the plurality of aerial devices does not satisfy a synchronisation requirement; and controlling the respective speeds of one or more of the plurality of aerial devices so as to synchronise the respective trajectories of the plurality of aerial devices, based on the synchronisation requirement not being satisfied at one or more of the synchronisation points.

Each path may be divided into any number of synchronisation points, preferably with each path being divided into an equal number of synchronisation points. Synchronising of the trajectories is advantageous when a plurality of aerial devices are used in cooperation with one another to build structures as described in more detail below.

The synchronisation requirement may comprise an aerial device arriving at the synchronisation point at substantially the same time as the other of the plurality of aerial devices. Thus, if an aerial device (because of the particular path it is following) arrives at a synchronisation point in its path after the other aerial devices have arrived at their respective synchronisation points in their respective paths, the aerial device will be determined not to have met the synchronisation requirement.

The synchronisation requirement may also comprise an aerial device having at the synchronisation point substantially the same speed as the other of the plurality of aerial devices. Thus, if aerial devices arrive at the same respective synchronisation points at the same time, but each with a different speed, then the synchronisation requirement will be determined not to have been met.

Controlling the respective speeds may comprise at the synchronisation point pausing flight of the one or more aerial devices until all aerial devices arrive at the synchronisation point. Thus, any aerial devices which arrive at a synchronisation point before other aerial devices may be programmed to wait until all aerial devices are 'caught up' (e.g. synchronised).

Controlling the respective speeds may comprise reducing the respective speeds of the one or more aerial devices. Thus, instead of idling or pausing at a synchronisation point, the speeds of the aerial devices having arrived at their synchronisation points first may be reduced to provide the lagging aerial devices time to catch up. Alternatively or in addition, controlling the respective speeds may comprise increasing the respective speeds of the one or more aerial devices. Thus, the lagging aerial devices may be sped up in order to catch up with the aerial devices in the lead.

The respective speeds of the one or more aerial devices may be controlled based on the one or more aerial devices satisfying the synchronisation requirement at the next synchronisation point. Thus, the speed increases/decreases may be determined such that the aerial devices all arrive at their next synchronisation point substantially simultaneously. The respective speeds of the one or more aerial devices may be controlled by applying a linear correction function to the respective speeds.

Each trajectory may be divided into the same number of synchronisation points.

The method may further comprise correcting a trajectory if the path comes within a predetermined distance of the path of another trajectory. This allows for a collision avoidance function to be built into the trajectories of the aerial devices. For example, correcting the trajectory may comprise applying the function:

$F=kx+(k-1)T$, wherein F is a vector defining the corrected trajectory, k is a constant, x is function of a distance separating the two paths, and T is a vector defining the non-corrected trajectory.

In a further aspect of the invention, there is provided a method of using a plurality of aerial devices capable of controlled flight. Each device comprises a lift generator for providing lift to the aerial device; and a deployment device for deploying an elongate flexible member. The method comprises: controlling the lift generator of each aerial device so as to controllably fly the aerial devices;

using the deployment device of each aerial device such that each aerial device deploys a respective elongate flexible member; and flying the aerial devices such that at least two of the deployed elongate flexible members contact one another, wherein at least one of the contacting elongate flexible members is adhesive or hardening.

The deployment device may be any device capable of deploying an elongate flexible member from the aerial device. The extent of the deployment may be a function of how far the aerial device has flown. For example, the elongate flexible member may be a string-like member arranged to de-spool during flight of the aerial device. The aerial device would therefore deploy an ever-increasing length of the string-like member during flight.

By using a plurality of aerial devices to carry out the above method, the deployed elongate flexible members may be contacted whilst the aerial devices are mid-flight. Due to the adhesive or hardening property of at least one of the elongate flexible members, the elongate flexible members may more readily bond/attach to one another. In the case of a hardening elongate flexible member, the deployed elongate flexible members may be more readily attached to one another/may be more readily fixed to one another if the aerial devices are flown such that one of the elongate flexible member is wound about the other of the elongate flexible members, thereby forming a node whereat the elongate flexible members contact each other. The elongate flexible member may be immersed in an adhesive prior to being deployed by the deployment device. The adhesive may be an ultraviolet curing adhesive. The adhesive may comprise cyanoacrylate, a two-part epoxy, or a two-part ceramic.

The elongate flexible member may be coated with an adhesive with the purpose of adhering to another elongate flexible member deployed by another aerial device. A hardening elongate flexible member may gain rigidity with time, for example in response to an external environmental stimulus such as humidity or temperature. The elongate flexible member may be both adhesive and hardening.

The method may further comprise attaching a deployed elongate flexible member to a supporting structure prior to the deployed elongate flexible member contacting another deployed elongate flexible member. The method may further comprise attaching a deployed elongate flexible member to a supporting structure after the deployed elongate flexible member contacts another deployed elongate flexible member. These steps may be repeated in order to form a web-like structure, wherein the web-like structure comprises a plurality of segments connecting nodes. Each node may be a point of contact/interconnection between two or more deployed elongate flexible members, and each segment may be a portion of a deployed elongate flexible members connecting two nodes.

Attaching the deployed elongate flexible member may comprise revolving the supporting structure with the respective aerial device. If the aerial device revolves around the supporting structure sufficiently rapidly, the frictional force generated between the supporting structure and the elongate flexible member may be enough to allow the elongate flexible member to naturally attach to the supporting structure.

Deploying the elongate flexible member may comprise de-spooling the elongate flexible member.

Each elongate flexible member may be deployed during flight of its respective aerial device.

Each aerial device may further comprise one or more sensors for generating sensor data of a surrounding environment in which the aerial device is controllably flown. Controllably flying the aerial device may comprise processing the sensor data of the surrounding environment.

The one or more sensors may comprise at least one camera. The lift generator may comprise at least one propeller.

Within the extent of this disclosure, any feature or element of any of the above aspects of the invention may be combined with any feature or element of any other of the aspects of the invention.

BRIEF DESCRIPTION OF THE DRAWINGS

Various embodiments of the invention will now be described in conjunction with the accompanying drawings, of which:

FIG. 14 shows an aerial 3D printer, quadcopter with integrated printing module in orientation ready for printing;

FIG. 15 illustrates examples (a) to (d), which show a foam deposit after increasing reaction time. The viscosity after a reaction time of 45 s is too inviscid for deposition. The limiting time was observed to be 90 s, before the foam hardened too much for deposition (a): 45 s (b): 60 s (c): 75 s (d): 90 s Grid spacing: 10 mm;

FIG. 16 is a schematic showing order and allocated times of each process which occurs within the printing nozzle. The printing operation requires 103 seconds to complete;

DETAILED DESCRIPTION OF SPECIFIC EMBODIMENTS

The present invention seeks to provide new and improved uses of aerial devices capable of controlled flight. Whilst various embodiments of the invention are described below, the invention is not limited to these embodiments, and variations of these embodiments may well fall within the scope of the invention which is to be limited only by the appended claims.

Figure 1:
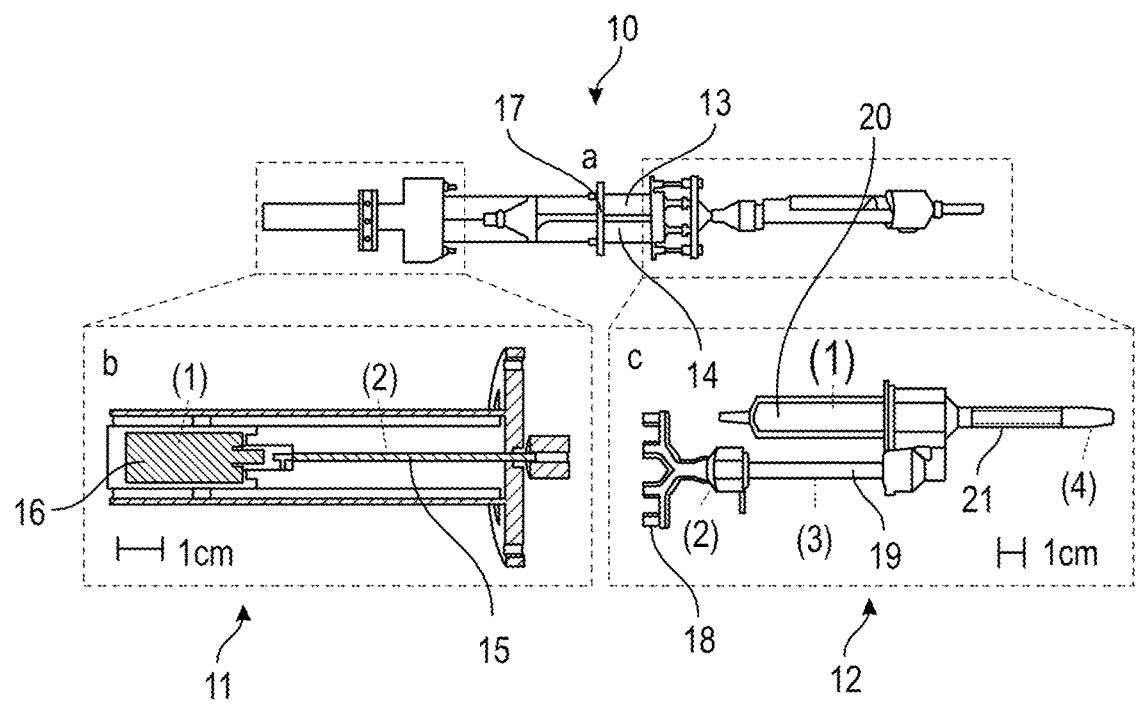
FIG. 1 is a schematic diagram of a dispensing assembly in accordance with an embodiment of the invention.

FIG. 1 illustrates a dispensing assembly 10 in accordance with an embodiment of the invention. As will be described in more detail below, dispensing assembly 10 is used to store, mix and dispense two or more chemicals that when combined produce an adhesive or other curable substance such as a foam.

Dispensing assembly 10 comprises actuator portion 11 and mixing portion 12. Actuator portion 11 and mixing portion 12 are each coupled to a pair of containers or reservoirs 13 and 14. Each reservoir 13 and 14 contains a chemical stored therein.

Actuator portion 11 comprises lead screw 15 driven by motor 16. Lead screw 15 is linked to plunger 17 that is used to force the chemicals out of reservoirs 13 and 14. Reservoirs 13 and 14 are placed parallel and in-line with lead screw 15. The power required for motor 16 is matched to the force required to move plunger 17.

Mixing portion 12 includes Y-splitter 18 fluidly linking reservoirs 13 and 14 to mixing nozzle 19. Mixing nozzle 19 is joined to reaction chamber 20 and printing nozzle 21.

When activated by motor 16, lead screw 15 causes plunger 17 to translate and force the two chemicals out of reservoirs 13 and 14. The two chemicals are mixed by joining their respective flows with Y-splitter 18 and pumping them through disposable mixing nozzle 19. Mixing nozzle 19 is a static mixer, whose internal geometry enhances mixing of the two chemicals. At the exit of mixing nozzle 19, the two chemicals are substantially fully mixed.

In order to increase the amount of time during which the two chemicals react, the two chemicals flow to reaction chamber 20 following their mixing in mixing nozzle 19. In a preferred embodiment, the mixture is of an adequate viscosity for deposition approximately 90 seconds after the flow initiates.

When foam or the desired adhesive begins to form in reaction chamber 20, air is pressurised in reaction chamber 20 so that the material is pushed to printing nozzle 21. Dispensing assembly includes a valve (not shown) to prevent outflow of the chemical mixture prior to complete mixing and reaction.

Further details of the above-described dispensing assembly may be found in the attached annex. The annex describes how dispensing assembly 10 may be used in conjunction with a robotic device to deliver a curable substance, such as a curable foam, during flight. Features of the embodiments described in the annex may be readily combined with features described herein, as would be understood by the skilled person.

Figure 2:
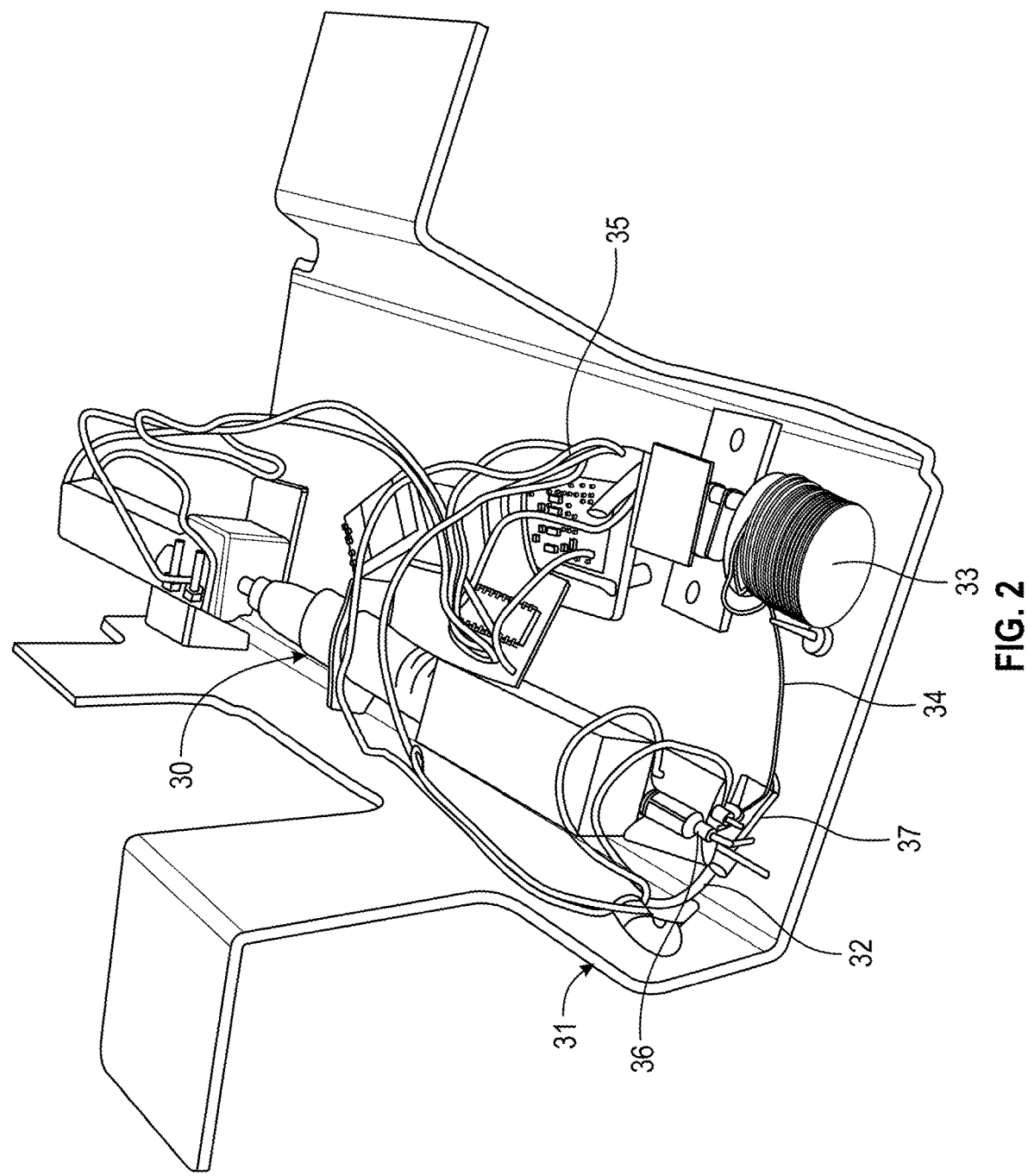
FIG. 2 illustrates an alternative dispensing assembly attached to a payload for use with a robotic device.

FIG. 2 illustrates a dispensing assembly 30 according to an alternative embodiment of the invention. Dispensing assembly 30 is attached to a payload 31 for use with a robotic device. Payload 31 comprises UV LED 32, spool 33 with string 34, and controlling circuitry 35 connected to dispensing assembly 30, UV LED 32 and spool 33. Printing nozzle 36 of dispensing assembly 30 is arranged adjacent opening 37 in payload 31 such that an adhesive (or other similar curable substance) may be dispensed from dispensing assembly 30 and out of payload 31. UV LED 32 is positioned above opening 37 such that when adhesive is dispensed from printing nozzle 36, curing of the dispensed adhesive may take place.

Spool 33 is controlled by controlling circuitry 35 such that string 34 may be controllably unwound from spool 33. As will be explained below in more detail, during controlled flight of the robotic device, adhesive is dispensed from dispensing assembly 30 through opening 37. Adhesive may be applied to a target site and is combined with string to bind string to the target site. UV LED 32 accelerates the curing of the adhesive such that string is efficiently affixed to the target site.

Figure 3:
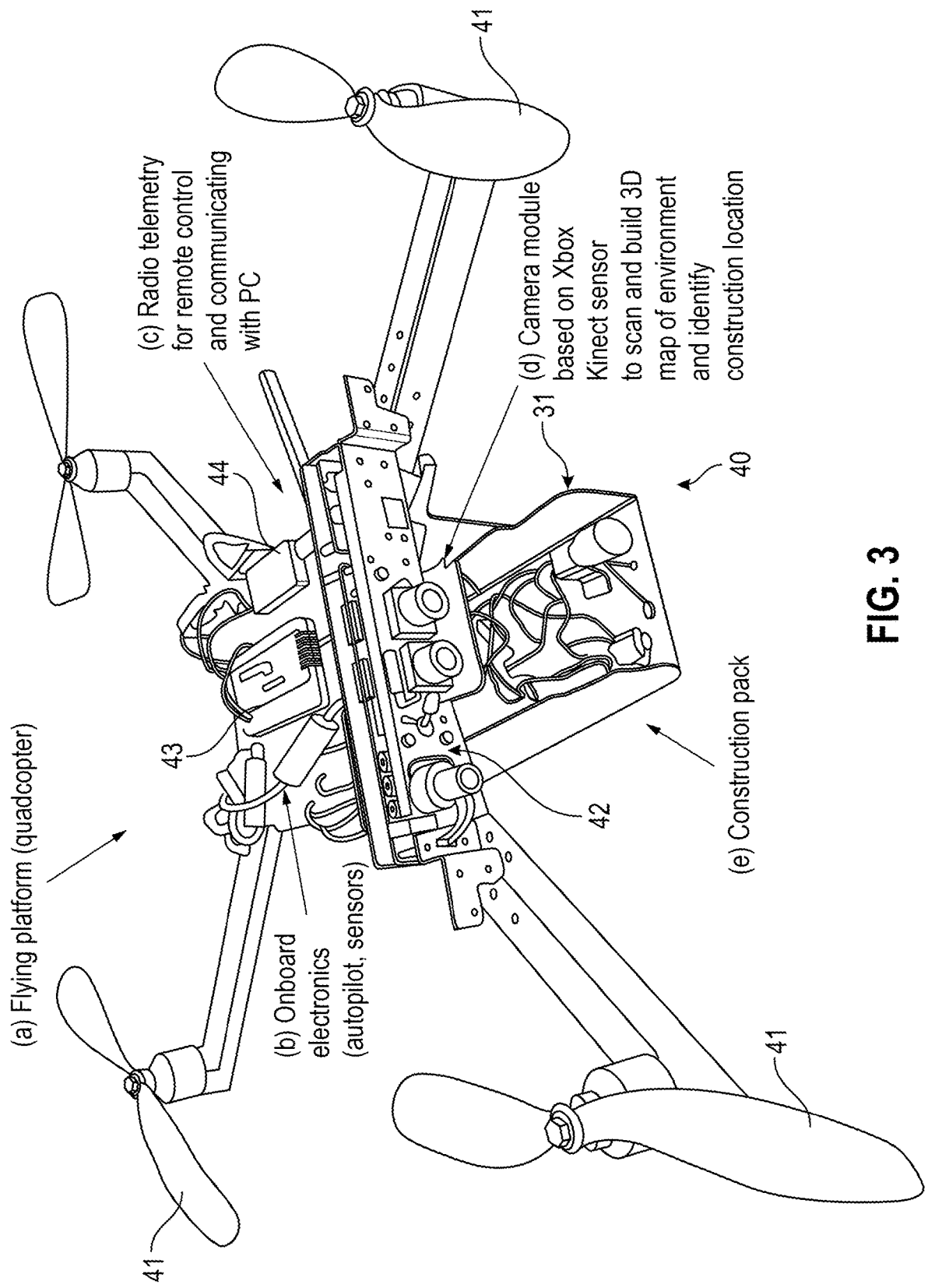
FIG. 3 illustrates the payload of FIG. 2 attached to a robotic device capable of controlled flight, in accordance with an embodiment of the invention.

FIG. 3 shows a robotic device, otherwise referred to as quadcopter 40, comprising payload 31 attached to the underside quadcopter 40. Quadcopter 40 comprises four propellers 41 arranged to provide lift to quadcopter 40. Quadcopter 40 further comprises imaging means or camera module 42 arranged to generate image data of the surrounding environment. In the present embodiment, camera module 42 includes a plurality of on-board cameras. In the illustrated embodiment, camera module 42 is based on the Xbox Kinect® sensor that is used to scan and build a three-dimensional map of the surrounding environment. The generated map may be used to assist autonomous navigation of quadcopter 40 through the environment. Other types camera modules may be used.

Propellers 41 and camera module 42 are under control of an on-board processor 43. For example, processor 43 may control the degree of lift provided to quadcopter 40, as well as process the data collected by camera module 42. In some embodiments, in order to provide navigational control to quadcopter 40, processor 43 may control the angle of propellers 41 relative to the horizontal and/or the amount of lift provided by individual propellers 41. In other embodiments, more or fewer propellers 41 may be used. Processor 43 is also arranged to carry out other functions, such as control dispensing assembly 30 in order to controllably dispense adhesive at target sites.

Quadcopter 40 further comprises on-board radio telemetry 44 for remote control and communications with a base station. Thus, as well as processor 43 being arranged to control propellers 41, dispensing assembly 30 and camera module 42, quadcopter 40 may additionally be controlled by a user communicating with quadcopter 40 from a base station.

A method of using robotic device or quadcopter 40 will now be described, in accordance with a preferred embodiment of the invention. Under control of processor 43, propellers 41 are activated and used to provide lift to quadcopter 40. Processor 43 further controls camera module 42 to collect image data of the surrounding environment. For example, using the on-board cameras, camera module 42 is able to construct a map of the surrounding environment. Using techniques known in the art, processor 43 may process the image data in order to controllably navigate or otherwise fly quadcopter within the surrounding environment.

A target site in surrounding environment is then identified. For example, the target site may be identified by a user transmitting the location of the target site to quadcopter 40. Alternatively, the target site may be identified by processor 43 processing the image data generated by camera module 42. The target site may be identified by a suitable computer vision software algorithm, for example by using SLAM (Simultaneous Localization and Mapping) or OpenCV (Open Source Computer Vision). Such software algorithms are able to create a 3D map of the surrounding environment based on the image data generated by camera module 42.

Once the target site is identified, processor 43 controls propellers 41 so as to controllably fly quadcopter 43 towards the target site. In the present embodiment, quadcopter 40 may fly or hover directly above the target site in order to be in a position to dispense the adhesive onto target site. In other embodiments, however, it is envisaged that quadcopter 40 may be arranged to dispense the adhesive through other apertures in payload 31. For example, quadcopter 40 may be arranged to dispense the adhesive laterally with respect to quadcopter 40, instead of vertically downwards. In particular, quadcopter 40 may land adjacent the target site prior to applying the adhesive.

When in position above target site, processor 43 controls dispensing assembly 30, and communicates with controlling circuitry 35 to activate actuator portion 11 and activate plunger 17 so as to begin the chemical mixing process. In some embodiments, the chemicals may be mixed before quadcopter reaches the target site, such that the adhesive is ready for dispensing by the time quadcopter 40 has reached the target site. Once processor 43 determines that the chemicals are mixed (for example once a predetermined amount of time has elapsed from the initiation of the mixing process), the valve of dispensing assembly 30 is opened so as to allow the adhesive to be dispensed ejected via printing nozzle 36. UV LED 35 is switched on to allow curing of the adhesive during its ejection from printing nozzle 36.

Once the adhesive is applied to the target site, string 34 from spool 33 is then combined with adhesive to affix string 34 to the target site. String 34 may be combined with adhesive in various ways. For example, once the adhesive is applied to the target site, quadcopter 40 may lower itself slightly to bring string 34 into contact with the applied adhesive such that string 34 may be affixed to target site via adhesive.

The curing of the adhesive results in string 34 being affixed at or in proximity to the target site. Quadcopter 40 may then repeat these steps so as to affix string 34 to other target sites. As string 34 is attached to spool 33, string 34 will follow the flight path of quadcopter 40 as it moves from target site to target site, with different portions of string 34 being fixed to different target sites in surrounding environment.

Figure 4:
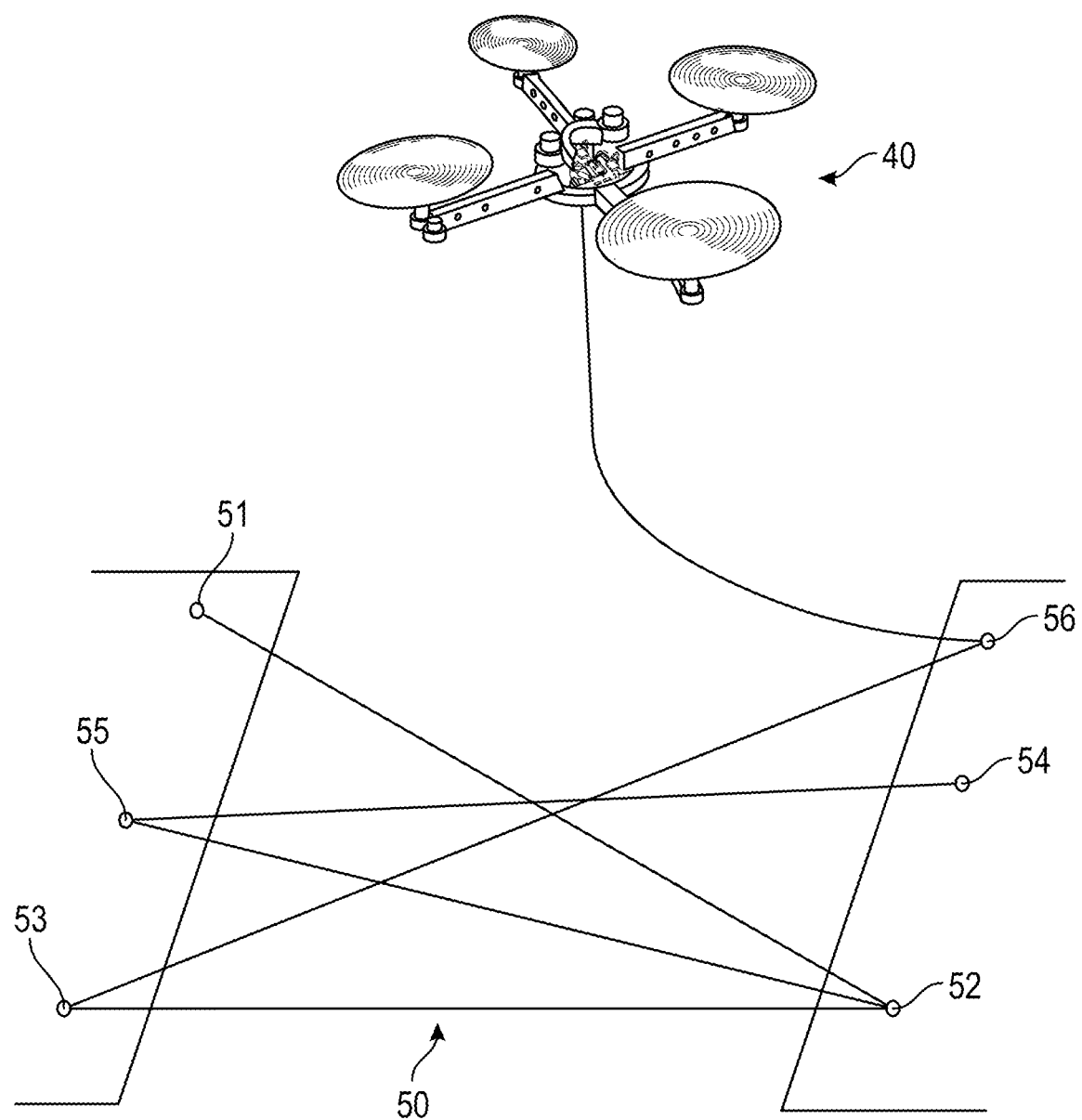
FIG. 4 is a schematic diagram of the robotic device of FIG. 3 creating a web-like structure, in accordance with a preferred method of the invention.

FIG. 4 illustrates schematically a web-like structure 50 that may be formed with quadcopter 40 affixing string to various different target sites 51-56. Quadcopter 40 begins by affixing an end of string to target site 51. The process is then repeated for target sites 52-56. Thus, web-like structure 50 is formed. Web 50 may be used as part of a process to form a composite material. For example, a curable foam layer (as described below) may be deposited on web like structure 50 once web 50 has been formed.

Figure 5:
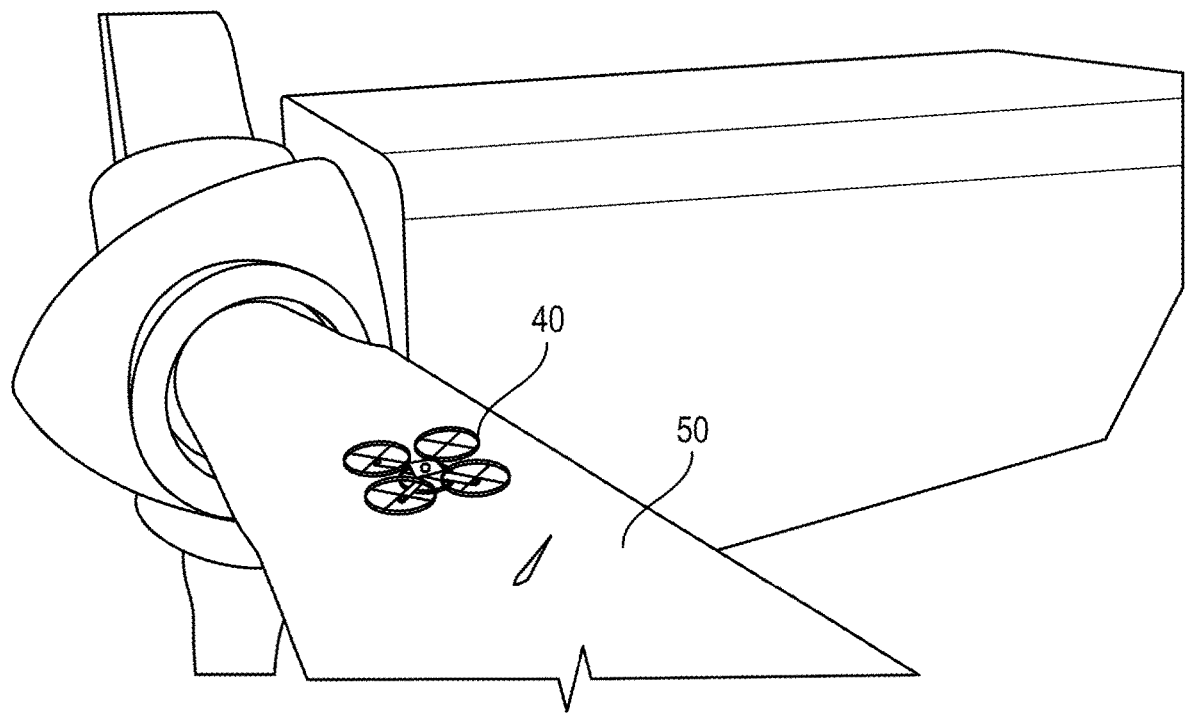
FIG. 5 is a schematic diagram of a robotic device creating a web-like structure to repair a damaged wind turbine.

FIG. 5 is a further schematic illustration of an aerial robotic device, such as quadcopter 40, repairing a damaged wind turbine 50 by building a web-like structure across the damaged portion. The web-like structure may provide a firm base upon which a curable foam layer may then be applied, to provide a protective patch to the damaged wind turbine.

Figure 6:
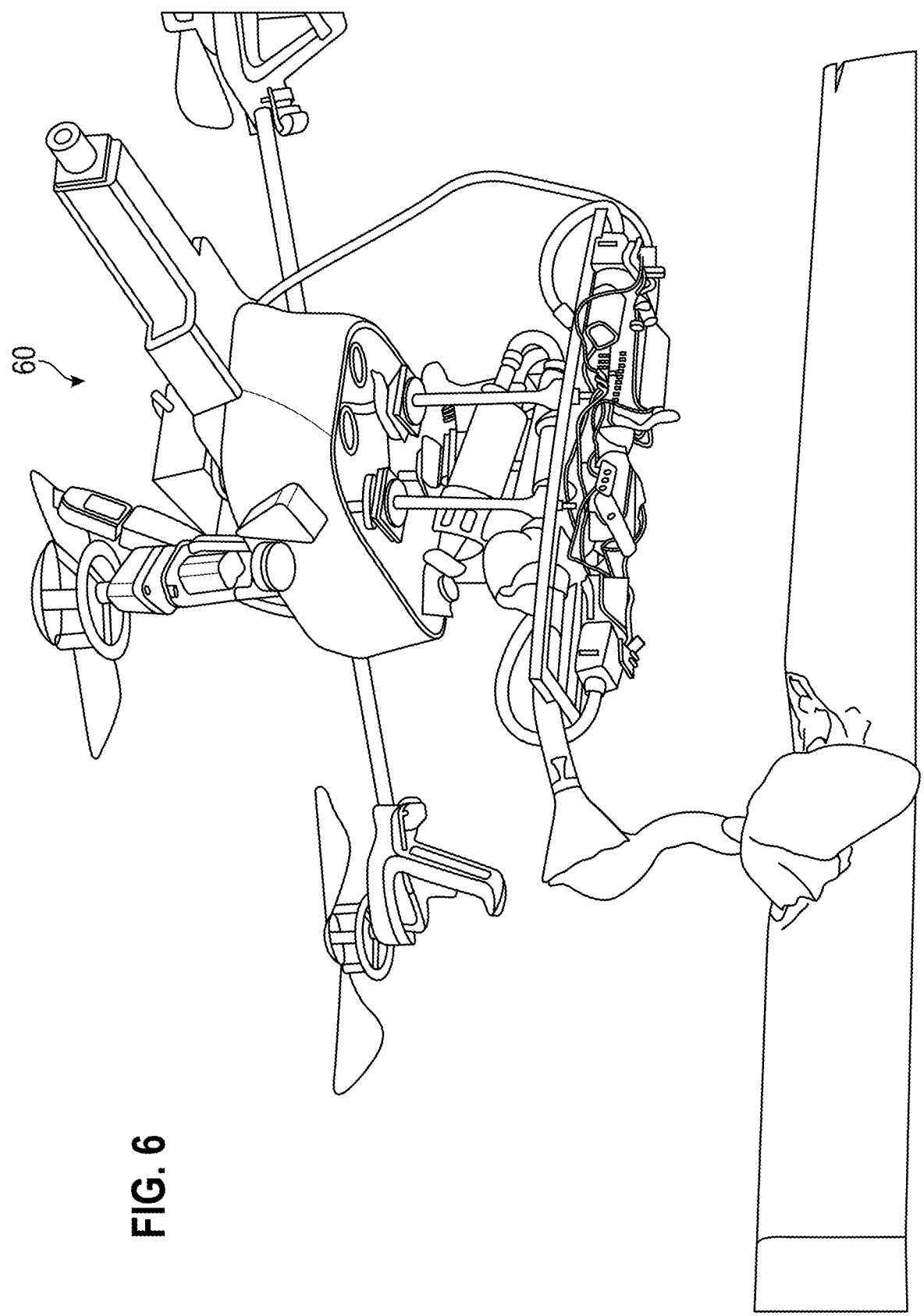
FIG. 6 illustrates a robotic device dispensing a curable foam, in accordance with a preferred method of the invention.

FIG. 6 illustrates an alternative embodiment in which a similar quadcopter 60 is used to deposit a curable foam on a target site. Quadcopter 60 is similar to quadcopter 40, except for the modification of dispensing assembly 30. In particular, a different printing nozzle 61 is used, and the chemicals provided in the reservoirs of its dispensing assembly combine so as to form a foam as opposed to an adhesive or glue. In addition, given the different chemicals that are used, the on-board processor of quadcopter 60 may be configured to vary the duration the chemicals are held in the reaction chamber, such that the resultant foam is of an appropriate viscosity upon ejection from printing nozzle 61.

In FIG. 6, quadcopter 60 is seen applying foam to a target site on a beam. The drawing is purely illustrative in nature, and the target site on beam is representative of a location in need of repair, for example as in the case of the damaged wind turbine of FIG. 5.

There will now be described several further embodiments relating to methods of using aerial devices capable of controlled flight.

Autonomous construction with aerial vehicles has promising potential for long-duration monitoring of inaccessible areas. In what fellows, there is presented and demonstrated a mechanism by which multiple autonomous nano-aerial vehicles construct a multi-element tensile structure between points in a prepared environment, such as natural woodland. Furthermore, there are demonstrated potential applications of such a structure to enable long-term position holding of aerial vehicles otherwise extremely limited in terms of available flight time due to power constraints. To demonstrate the effectiveness of this solution, the mechanical and electronic designs of two payload packages that are attached to nano quadcopter robots, with a mass of only 19 g, were developed. Furthermore, the trajectory planning and control algorithms required to enable reliable execution of this scheme of collective construction and perching are discussed. The presented method opens up the applicability of such robots in a wide range of tasks over longer timescales than are conventionally considered for such systems.

Figure 7:
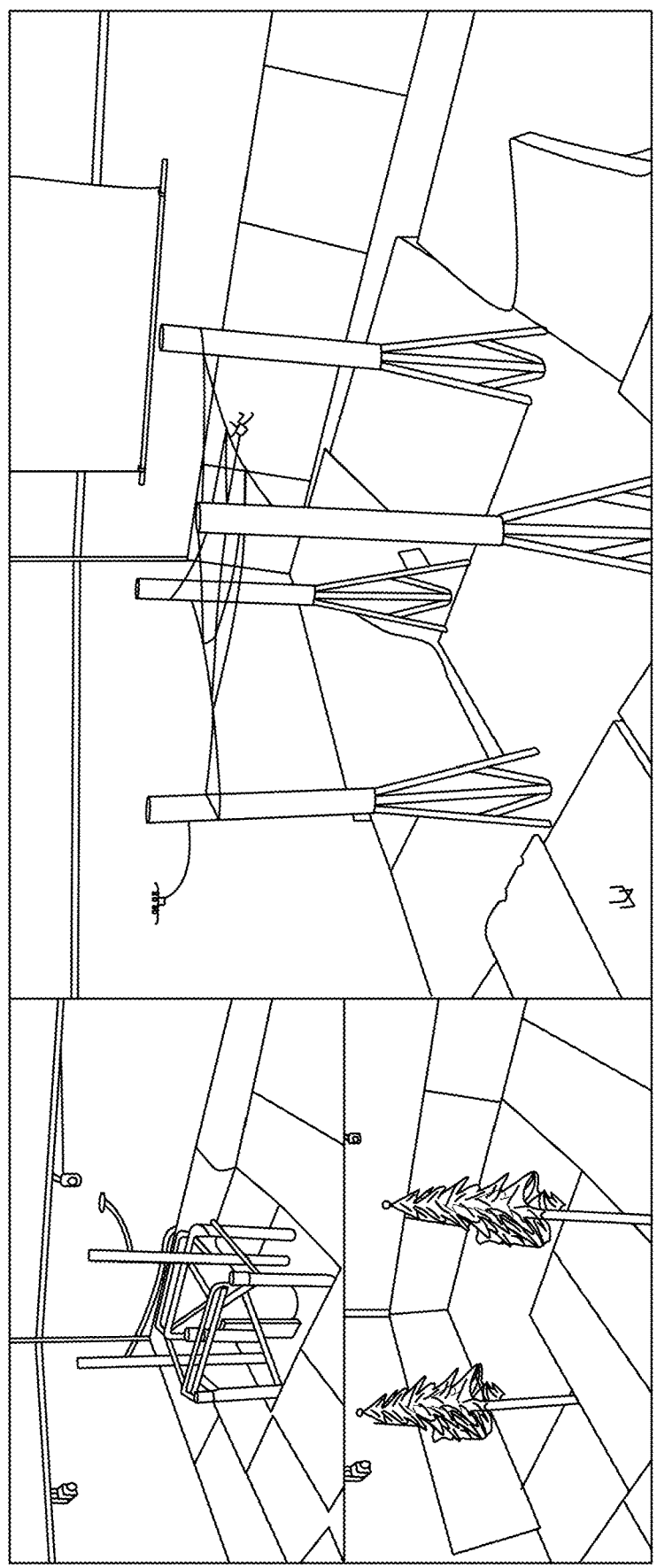
FIG. 7 illustrates string-based construction with NAVs.

Multi-rotor unmanned aerial vehicles (UAVs) are a subject of intense interest within both the robotics community and society at large, whilst industrial interest is also expanding rapidly. These vehicles have been proposed for numerous applications, from airborne monitoring and mapping to large-scale construction projects. The fundamental nature of rotary aircraft lends them the ability to maintain a relatively simple hover and excel at low-velocity, high accuracy maneuvering. However, such craft also exhibit significant drawbacks when compared to conventional fixed-wing aircraft; they have relatively poor flight endurance, and are poor at high-velocity cruising due to the low lift-to-drag ratio exhibited at such speeds. In what follows, there is presented a method to mitigate flight time limitations for such rotary UAVs by constructing a structure within the immediate environment and subsequently perching upon the said structure. Another limitation of virtually all aerial craft is relatively poor applicability in severely enclosed spaces. Fixed-wing MAVs must maintain a minimum airspeed in order to sustain flight, which is not possible in enclosed spaces little larger than the craft itself, whilst multi-rotor MAVs are highly susceptible to aerodynamic effects and interference from the environment whilst in close proximity to external surfaces, and thus struggle to maintain static flight in closely confined spaces. FIG. 7 shows three distinct types of string-based construction with NAVs: (a) Single NAV constructs a structure between two supports; (b) Two NAVs create a linking node around two supports; and (c) Two NAVs cooperatively construct a web-inspired structure around four pipes.

There is proposed an extension to the MAV platform to enable maintenance and control of relative altitude whilst perched upon an external structure, requiring no active attitude control and thus the use of only a single motor. Employment of such a system is envisaged in complex environments in scenarios requiring long-term position maintenance, such as monitoring inaccessible areas of remote rainforests for environmental variations. To maximize the range of applicability of such a scheme in tightly constrained environments, we focus on sub-miniature multi-rotor UAVs, here defining a nano aerial vehicle (NAV) as a robot with an unloaded mass of no more than 20 g and a span of less than 10 cm. Such a system may be employed to inspect and monitor for damage around industrial sites otherwise considered extremely difficult to access, such as around and within pipework intrinsic to huge petrochemical refinery installations. To facilitate such monitoring, additional sensors (light, temperature, or a video camera) may be mounted to these NAVs and activated when successfully perched in the required area.

We demonstrate how multiple NAVs can cooperate to complete certain construction tasks. Second, we employ time-stamped trajectories that adapt the construction blueprint based on the availability of physical supports in the environment. Thirdly, we demonstrate a string-based perching mechanism for low-power altitude control.

The following disclosure is organised as follows: Section 1 describes our approach to string-based construction including the types of tensile structures we propose and the two distinct types of payloads we use for NAVs involved in construction and perching. Section 2 discusses our construction trajectories and describes how we devise our trajectories to adapt around physical constraints in the environment. The experimental setup is discussed in Section 3, including the infrastructure we use and the controllers we utilize. In Section 4 we present our construction results and discuss implications of this type of robotic construction.

1. String-Based Construction

The primary constraint on any structure assembled entirely by small drones as employed here is the available payload within which both the construction system and material must be carried. Some of past work with regards to aerial construction assumes a nearby supply of building materials, and each drone carries only a small fraction of the entire construction mass at any one time. However, such an approach rather limits the range of applicability of such systems in the wider world—the extremely limited flight time of MAVs on this scale together with the inaccessibility of environments in which we envisage such a system being employed necessitates the entire mass of the construction to be carried by the swarm during the approach the construction site.

To enable construction of and perching on the proposed tensile structures, we propose two distinct payloads for the NAVs involved. The first NAV, henceforth referred to as constructor, should enable a method of thread attachment to the external environment, a mechanism by which the thread may be deployed simply by the motion of the quadcopter (but retained whilst hovering) and a method of completing the structure and detaching to return to base. The second NAV, henceforth referred to as percher, carries a payload with the aim to perch on the structure created, and therefore provides a method of suspending the drone in a state from which flight can be consistently recovered by the control scheme employed. A mechanism to control the height of the quadcopter below the structure may be used to extend the capability of such suspended drones, and should exhibit the minimum possible energy consumption to demonstrate significant advantages over simple hovering.

When constructing tensile structures using ropes or wires we distinguish between two types of node. Nodes placed on pre-existing environmental elements (such as the trees employed here) act as supports to the structure and hence are referred to as supporting nodes. Nodes created by two or more quadcoptors interlinking their respective web elements so as to connect two tensile structures are referred to as linking nodes. The methodology used to create a node depends on which type of node is to be created; we devise trajectory elements for each. The string-based web elements may be adhesive and/or hardening, so as to improve the bond between the string-based based web elements.

Figure 8:
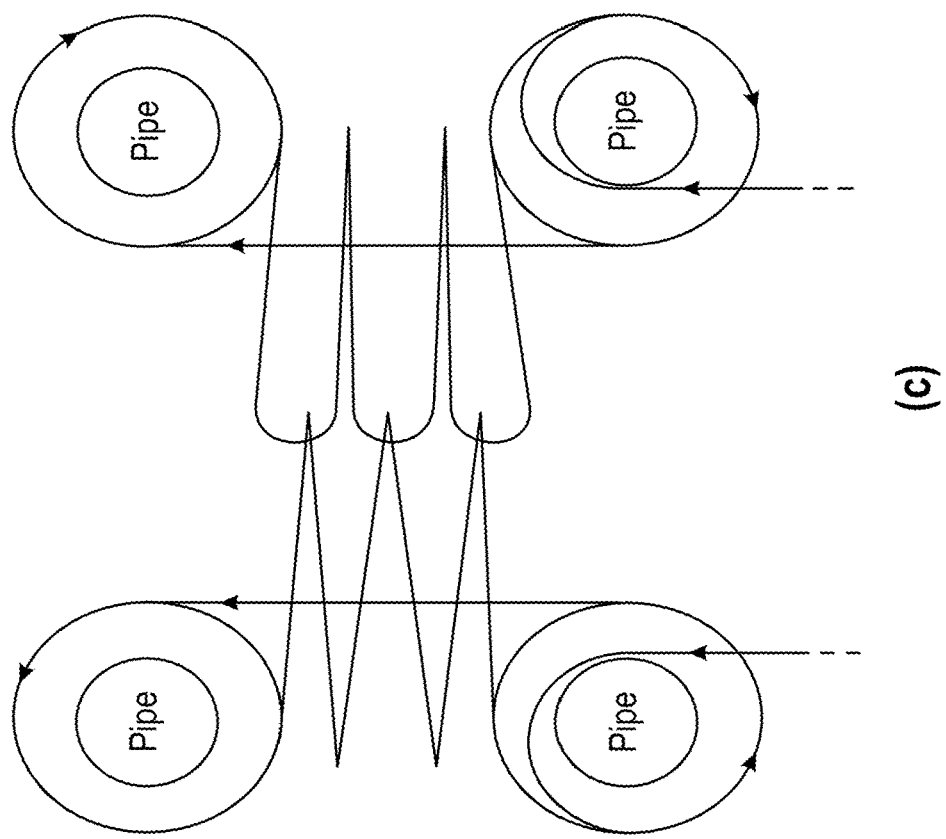
FIG. 8 illustrates different string-based structures.
Figure 8:
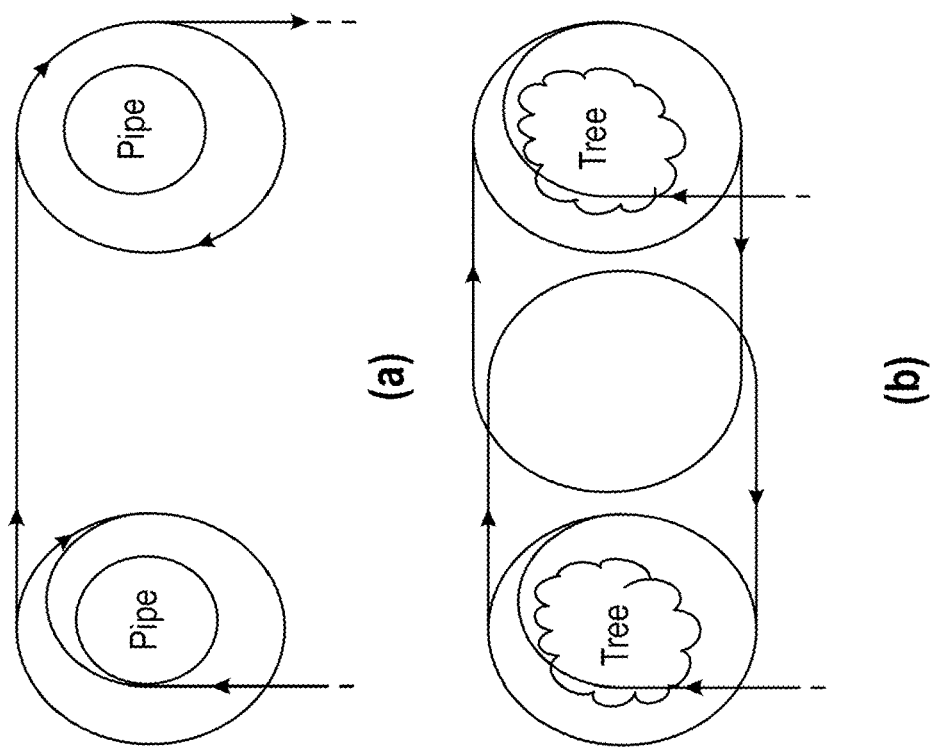

FIG. 8 shows three distinct types of string-based structures we propose: (a) Single constructor path between two supports; (b) Two constructors between a pair of supports; and (c) Two constructor paths between four supports.

The purpose of a supporting node is to serve as a rigid, load-bearing anchor to the tensile structure. It should therefore sustain tensile forces arising due to both the weight of the structure itself and any payload attached. To create a node capable of withstanding these tensile forces, we consider the friction effect between the web component and the supporting body. By creating multiple turns around an object, the frictional force may be increased to a sufficient level to support the desired structure. To model the required number of turns for any given element, we consider the expected forces in each element of the web and then refer to the Capstan equation. For tension applied to the two ends of a string, T1 and T2, static coefficient of friction $\mu$, and total angle swept by all turns of the string $\Theta$, the equation dictates that the string will remain static if the following condition is satisfied:

$$T2 < T1 \exp(\mu|\Theta|)$$

The first manoeuvre required to create such a node is a close pass of the tree to attach the construction hook and provide an initial attachment between the tree and the web. Multiple encirclements of the anchor point then fellow to deposit the required length of string for the tensile forces expected, as determined by the above equation. The angle $\Theta$ is directly related to the number of encirclements and hence the tensile strength of the support increases exponentially with the number of revolutions performed.

A linking node connects two structural elements, each attached to their respective supporting nodes. To achieve this, two NAVs approach each other on offset trajectories until they reach the point of minimum separation between them. They then fly opposing semicircles in the horizontal plane so as to switch positions and create a link between their respective web elements. The altitude of both quadcoptors is linearly increased by a total of 0.5 m throughout this manoeuvre to avoid the collision of any vehicle with the string deposited by the other. Both NAVs return to their respective original positions horizontally aligned with the supporting nodes will to pull the thread components taut. The tension inherent in the resulting linked structure will equal the tension required to unroll additional thread from the construction module, which is then formed into a further supporting node to complete this element of the structure.

Linking nodes between more than two elements may be created by employing more than two quadcoptors in the manoeuvre described—one for each element. We use the term web to describe the tensile structures we aim to create, consisting of multiple interlinked non-rigid elements. When assembling and perching on a web, we are especially interested in the following properties:
  Accuracy of NAV trajectories and hence accuracy of placement and geometric characteristics of the web produced;
  Structural properties of the web, including maximum loading in a vertical plane to characterise the ability of the structure to support one or more perched drones below;
  The ability of the perching drones to autonomously approach, mount, dismount and leave the web structure without causing material detriment to the long-term properties of the web.

Figure 9:
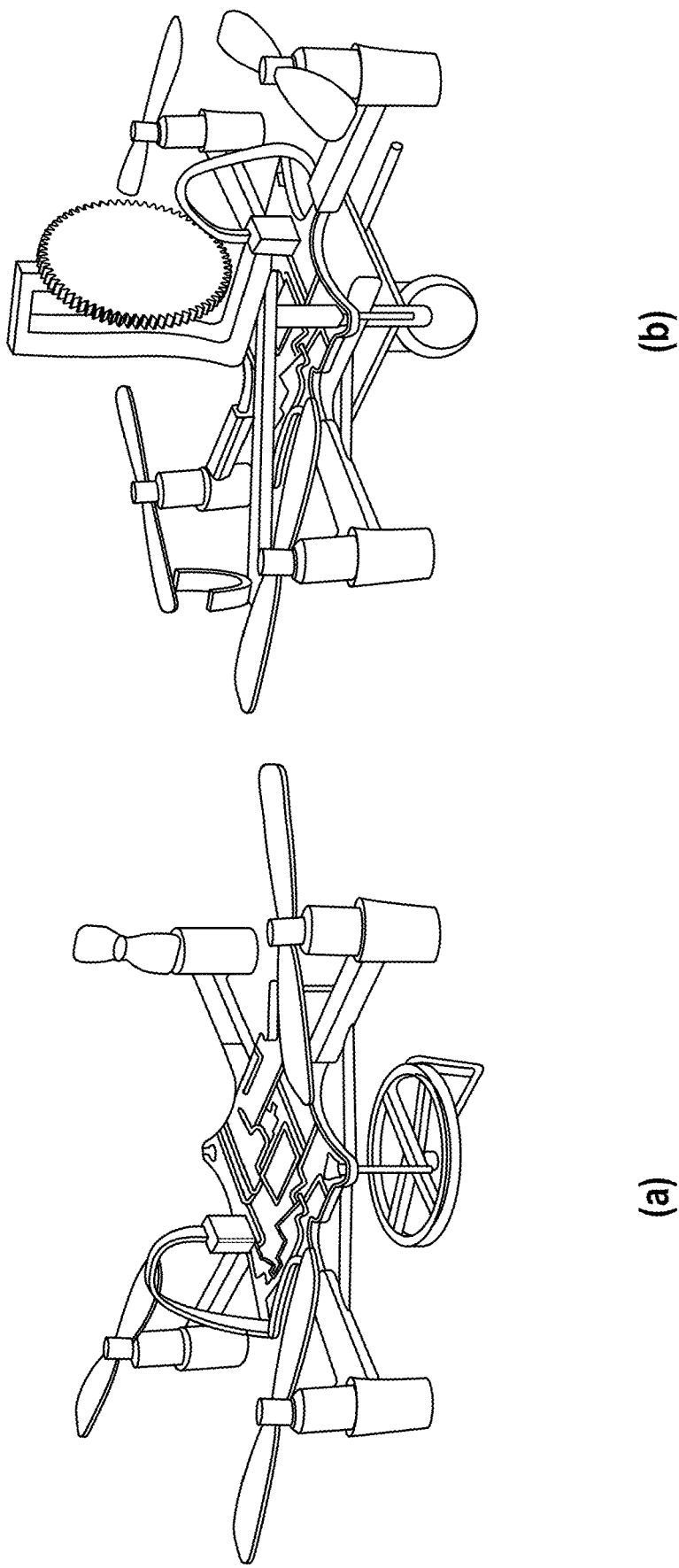
FIG. 9 illustrates two types of NAVs.

FIG. 9 illustrates two types of NAVs we propose: (a) Constructor drone with a payload in the form of a spool; and (b) Percher drone with an overhead payload consisting of a spool of string and a brushed DC motor.

To enable assembly of the web, we define our target process to be the robust deployment of multiple discrete tensile elements between pre-existing structures. The constructor payloads aim to enable deployment of the web material through only applied tensile force carried by the material itself; that is, the deployment mechanisms on the modules themselves are entirely passive. We therefore require the initial force for deployment to be greater than the force required to overcome the static friction between the spool and the supporting central rod and hence begin to unspool the thread from the construction module, approximately 2.3 mN.

To model an unstructured anchor point to reasonably represent that present in a natural environment, we employ two artificial trees mounted on supports to reach a peak height of around 2 m. The foliage of these trees is arranged in a relatively unstructured pattern (with no convenient protruding sections for attachment) to best emulate coniferous woodland in the real world. To enable reliable connection with these structures, we choose to design a small hook to embed itself within the foliage of the tree and provide initial resistance to small forces. This connection may then be further reinforced via trajectory winding methods discussed later. The precise configuration of the attachment mechanism employed is heavily influenced by our current experimental setup (that is, the use of these particular tree analogues), but the method may be optimised or altered to suit differing environments, such as small magnets for metallic objects or larger hooks for less dense foliage. Our hooks feature 4 prongs in a radial configuration with a total diameter of 14 mm with a tooth inclination of 50°. Web material choice was based on weight, strength and roughness/static friction. We require sufficient roughness to sustain a sufficient reaction force by static friction against the tree foliage to oppose that exerted downwards when other NAVs perch upon the structure. Silk thread, 0.35 mm diameter, suited this criteria with 8 m of thread weighing under 1 g and providing a high enough coefficient of friction to resist an applied load of 85 g in the web under testing, sufficient to support three perched NAVs.

For stability and ease of control, we desire the center of gravity to be coincident with the centre of force applied to the drone—for these symmetric quadrotors in unrestrained flight, this means directly below the centre of the body. The battery is positioned below the centre of the drone with the construction pack extended directly below this. It carries a spool capable of holding 8 m of silk threading with a separately rotating arm assisting in deployment and controlling the release point to minimize the magnitude of out-of-plane forces on the thread ($F_n$, Fb in the normal and binormal directions respectively). Assuming these forces are small compared to the in-plane component, Ft, the torque, $\tau$, or moment induced on the quadrotor by the tension force in the thread is linearly related to the distance, r, to the quadrotor center of mass.

Although the pitch and roll moments exerted on the NAV should be relatively time-invariant if a constant force is applied to the thread, the torque about the vertical body axis will vary as string is removed from the reel and thus the effective separation between the detachment point and the centre of mass changes. Heading direction is therefore designed to be unconstrained, allowing any orientation in flight and therefore meaning the controller is relatively uninfluenced by this variable load. The empty mass of the constructor payload is 0.89 g, with a maximum capacity of 8 m of silk string giving a loaded mass of approximately 2 g.

The percher payload allows NAVs to dock to the web and maintain active vertical control by spooling and de-spooling the connected thread. The docking procedure is accomplished by an NAV following a trajectory perpendicular to the web approximately 5 cm above the intended point of attachment, with the connection thread suspended a short distance below. The NAV moves across the web from one side, and once crossing slowly decreases the motor thrust whilst maintaining slow forward flight to avoid any interference between the thread and propellers. A hook at the end of the connecting thread then catches the web and creates a robust attachment between the web structure and perched drone.

To resume flight, we may either de-spool the remaining thread from the percher module thus detaching from the end of the thread, or effectively perform the docking procedure in reverse. This second method is functionally preferable as the system is then capable of re-perching on the web in future, but the mechanism chosen in any particular scenario is dependent upon environmental constraints. The first method to dismount requires sufficient vertical space to fully extend the thread, but negligible horizontal space, whilst the second method requires less horizontal space but a greater horizontal travel distance perpendicular to the web to ensure the connecting thread is continually taut.

The percher module incorporates a brushed DC motor to enable active altitude control whilst suspended from the thread—given the excellent power/weight ratio of the Crazyflie motors, we elect to use one more of these for this purpose. The motor torque required to sustain ascent of the MAV whilst perched increases linearly with the effective diameter of the thread spool. Considering a maximum permitted NAV mass of 25 g (set by the flight payload limit), we prescribe a maximum spool diameter of 6 mm, allowing approximately 2 m of thread. We require the motor exert sufficient force to exceed both the static friction and the force required to lift the drone, approximately 0.3 N, and so employ a gear mechanism to increase the effective torque by a factor of 5. The rotational speed is controlled by pulse width modulation of the motor, at 100 Hz, varying speed by altering the duty cycle.

Damping of vertical motion along the connecting thread is achieved by a combination of static friction and active, motor-enabled braking. The static friction of the system is sufficient to maintain the altitude of the NAV whilst stationary, allowing station keeping with minimal system current draw (<10 mA). For comparison, active hovering requires more than 2 A from the 4 flight motors, at minimum payload weights. Dynamic manoeuvres whilst perched require active braking. Active braking is achieved by our motor controller, applying up to 100 mA to rapidly damp motion when required.

Figure 10:
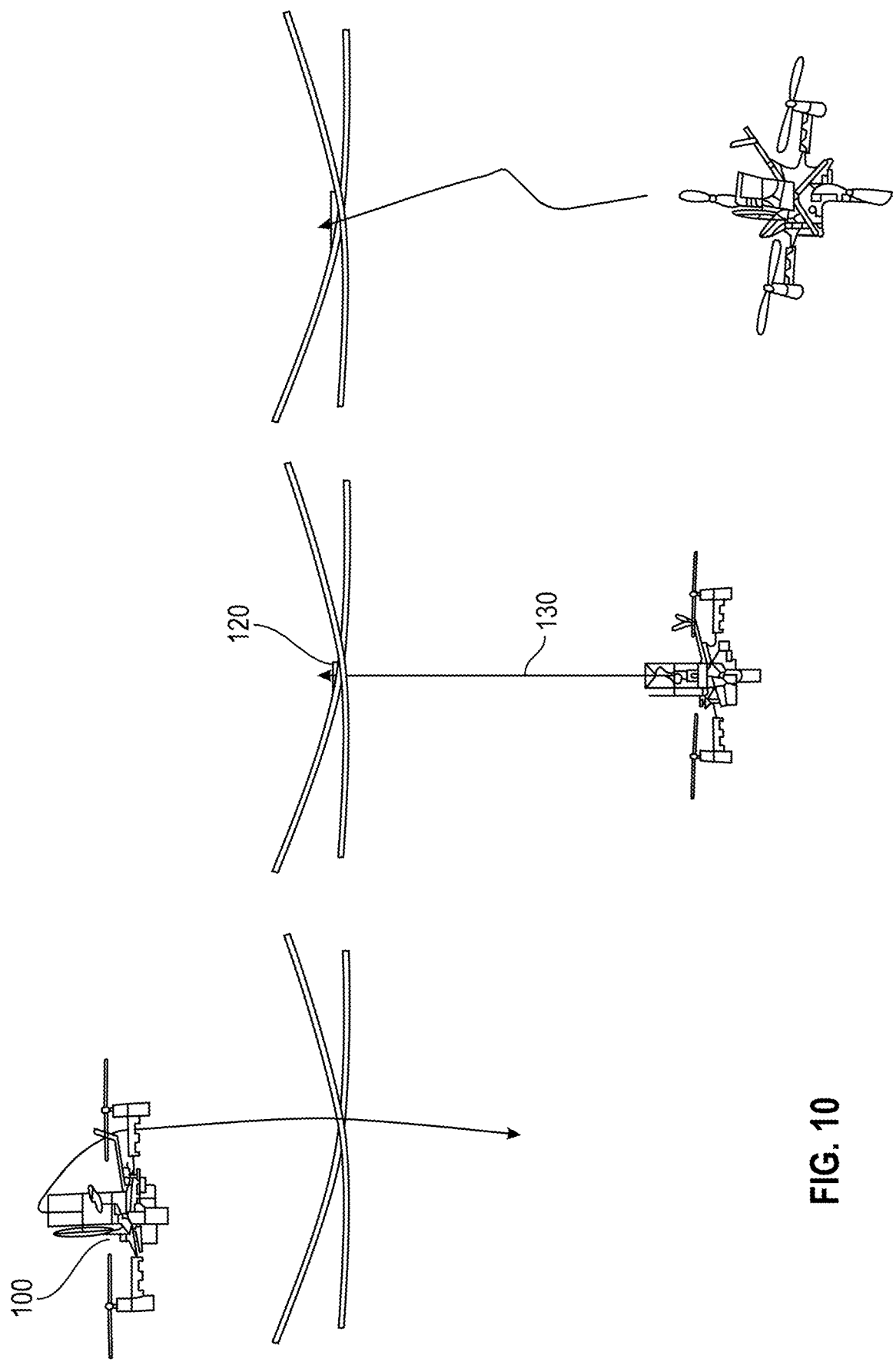
FIG. 10 illustrates a NAV perching from a node.
Figure 11:
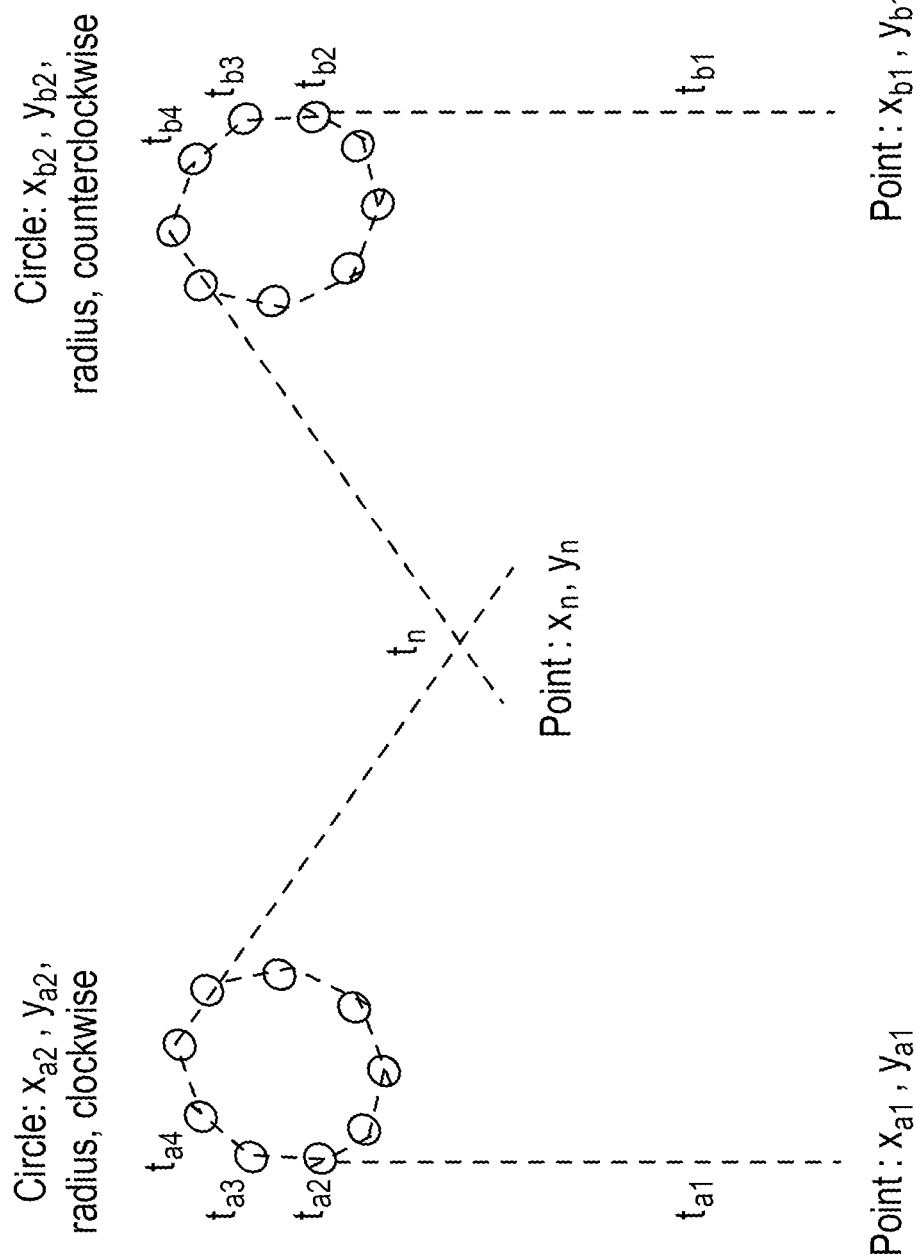
FIG. 11 illustrates the division of trajectories into synchronisation points.

FIG. 10 shows an NAV 100 perching from a node 120 by means of a suspension device 130, in this case a string-like element with a hook at one end. FIG. 10 also shows NAV 100 detaching itself from the string-like element (for example by cutting or fully de-spooling the string-like element).

2. Trajectory Planning

In order to simplify the process of trajectory definition, we propose an abstraction that allows the user to define complex flight paths and timings required for cooperation between vehicles easily and quickly. Simple trajectories may be defined by points and circles alone. The user must first split the path to be flown into multiple segments, which must each be representable by a simple building block such as a point, a straight line or a circle. Note that a line can be defined by two points. We then propose defining the trajectory as a list of those building blocks along with the arguments required to fully constrain them in three dimensional space. For example a point in space may be fully defined by the set of its Cartesian coordinates while a horizontal circle may be fully defined by the coordinates of its centre and its radius. To allow for a more complicated structure such as a spiral an initial and final altitude may also be specified. Furthermore, the direction of rotation and number of revolution is required to define a meaningful path for an aerial vehicle. Note that a curved path can be achieved by defining a circle with less than one full rotation resulting in an arc. For those two most basic building blocks the instruction and arguments are as follows:

Point: coordinates
Line: two coordinates
Circle/Spiral: coordinates of centre, radius, initial and final altitudes, direction of revolution, number of revolutions Whilst this approach restricts the possible shape of the flight path, the advantages of such a simple trajectory definition are that the generation of paths is very simple for the user. This means, that the process of defining a trajectory becomes fast and errors are unlikely as the list defining the trajectory is relatively readable. Furthermore, this approach enables us to apply geometric transformations in order to adapt to a changing environment (see below)

A computer can create a meaningful path given a set of instructions defined as described above. A path is a set of points that defines the geometrical shape of a trajectory. To do so the computer deals with the list of instructions step for step turning it into a list of consecutive points in space. Circles cannot be exactly represented by a finite number of points alone, and hence must be approximated as polygons.

It is desirable for a path to consist of circles and straight lines that lie tangentially to them, as this minimises sudden accelerations. Therefore, the tangents to any circular segments must be found. They depend on both the preceding and succeeding segments and hence, both the preceding and succeeding segment must be taken into account when creating the path segment from a 'circle' instruction. Given this information the tangents to the circle can be found from geometrical arguments. Care must be taken to ensure cases in which a tangent does not exist—such as in the case of concentric circles—are dealt with sensibly.

The definition of a trajectory is a path as a function of time. Hence, to arrive at a trajectory, the time at which the vehicle is to arrive at each point must be defined. For a flight with constant speed v this can be done by using Pythagoras' theorem to find the distance between any two consecutive points and dividing by the speed to arrive at the time difference that separates the two points. For points n and n−1 with respective Cartesian coordinates $(x_n, y_n, z_n)$ and $(x_{n-1}, y_{n-1}, z_{n-1})$ this results in the following expression:

$$t_n = \frac{\sqrt{(x_n - x_{n-1})^2 + (y_n - y_{n-1})^2 + (z_n - z_{n-1})^2}}{v}$$

Calculating the time for each point in the path starting with $t_1=0$ and attaching it to the coordinates of each point a trajectory is obtained. This procedure makes controlling the actual time when a vehicle reaches a certain point complicated. For cooperative construction, however, precise timing and synchronisation are necessary in order to guarantee the successful construction of a node. Hence, we introduce another instruction—'synchronise'—which creates a point in the path at the same location as the last point on the preceding segment but resets the attached time to 0. This acts as a marker (e.g. a 'synchronisation point') subdividing a trajectory into i+1 elements, where i is the number of synchronisation points. Given that i is equal for each trajectory, we can look at the corresponding element in the trajectory of each individual vehicle and determine which vehicle reaches the end of its element last. We then apply a linear correction to the times at all points of all other vehicles such that the time of the last point in the element is the same for each vehicle. Thus, the speed of the vehicles is slowed such that they all reach their respective synchronisation points simultaneously. If the element is not the first one in the trajectory, then the time attached to the last point in the previous element is added to all the times. Hence, a trajectory, which is continuous in time, consists of multiple elements of different speed and makes sure that all vehicles reach the specified synchronisation points simultaneously. The speed will, however always be lower than or equal to the specified speed v.

At runtime, a timer is started when the trajectory is started. This timer is used to determine at what point p along its respective trajectory a vehicle should be. For a time t larger than $t_n$ but smaller than $t_{n+1}$ attached to points with coordinates $p_n$ and $p_{n+1}$ respectively linear interpolation is used to find the position p at which the vehicle should be:

$$p = p_n + (p_{n+1} - p_n) \times \frac{t - t_n}{t_{n+1} - t_n}$$

To define a trajectory as outlined above, the position of any objects in the environment the vehicles are interacting with must be taken into account. For example the position of any structures used for supporting nodes serves as constraint to the geometry of the path. The generated flight path will only fit those specific positions. If, however, the position of those objects in the environment changes, the trajectory must be redefined. We propose automating this process in order to arrive at a robust trajectory definition that can be extended to an arbitrary environment given the location of defining constraints.

TABLE 1

Type of geometric transformation required for trajectories with different numbers of constraints

| Number of constraints | Transformation |
| --- | --- |
| 1 | Euclidean |
| 2 | Similarity |
| 3 | General affine |
| 4 | Projective |

The basic geometry of a flight path may be defined using arbitrary constraints such that trajectory definition is simplified. Then, given the position of the corresponding objects in the environment, linear geometric transformations can be applied to map the generic path onto the specific environment. The benefit of using a linear transformation is that the straightness of lines is preserved, where other transforms introduce distortion. The transformation required depends on the number of constraints (see Table 1).

As the shape of the path is not preserved for every transformation listed (circles become ellipses under affine and projective transformations), we do not apply the transformation to the completed path. Instead, we apply the transformation to the coordinates passed as arguments with the trajectory building blocks described above, thus preserving the shape and size of circles. While a perspective transformation is non-linear in inhomogeneous coordinates, it is linear in homogeneous coordinates. Hence, a general linear transformation can be expressed using the 3×3 transformation matrix T which maps a point with homogeneous coordinates $(x, y, 1)^T$ and $(x', y', 1)^T$. As T is homogeneous, it may be multiplied by an arbitrary non-zero factor without altering the transform. Thus, T may be normalised to eliminate one degree of freedom. The transforms shown in the following are for two dimensional cases only for simplicity. The approach has natural extensions into three dimensional space.

$$\begin{pmatrix} x' \\ y' \\ 1 \end{pmatrix} = T \cdot \begin{pmatrix} x \\ y \\ 1 \end{pmatrix}$$

The transformation matrix T may be defined from both the constraints used in defining the general shape of the trajectory and their positions in the environment. In the case of a single constraint a purely Euclidean transform may be applied.

$$T = \begin{bmatrix} \cos\theta & -\sin\theta & t_x \\ \sin\theta & \cos\theta & t_y \\ 0 & 0 & 1 \end{bmatrix}$$

As there is only one pair of corresponding points—(x, y) and (x', y')—but three degrees of freedom ($t_x$, $t_y$, and $\theta$), this system is underdetermined. Unless a parameter specified by hand (the rotation $\theta$ is most practical) a single constraint is not enough to define a robust trajectory. For two constraints, a similarity transformation matrix is given the composition of a Euclidean transform and an isotropic scaling factor s.

$$T = \begin{bmatrix} s \cdot \cos\theta & -\sin\cdot\theta & t_x \\ s \cdot \sin\theta & s \cdot \cos\theta & t_y \\ 0 & 0 & 1 \end{bmatrix}$$

Using the pair of constraints and corresponding positions the four unknowns can be solved for. For three constraints a general affine transformation is given by:

$$T = \begin{bmatrix} a & b & t_x \\ c & d & t_y \\ 0 & 0 & 1 \end{bmatrix}$$

Using the three pairs of corresponding points the six unknown matrix coefficients can be solved for. Finally, for trajectories constrained by four points, a projective transform is required. The transformation matrix is:

$$T = \begin{bmatrix} a & b & c \\ d & e & f \\ g & h & 1 \end{bmatrix}$$

The eight unknown matrix coefficients can be solved for given four point correspondences under the condition that no three of the points are collinear. In the case of the web construction outlined in Section 1 the flight path can be defined for a generic set of support positions that simplify the trajectory definition. In this example there are four support positions acting as constraints. Those four constraints can be mapped onto the actual positions of the supports by a projective transformation.

For a higher number of constraint-position pairs more complicated transformations, such as topological and other non-linear transformations, are required. If one cannot reduce the number of constraints to four one can subdivide them into multiple groups, each with their own transformation, under the condition that any aerial vehicles interacting are on trajectories transformed by the same transformation. This is required to ensure that the point of interaction is the same for both quadcopters even after a geometrical transformation has been applied. Thus, a subdivision only taking into account the constraints directly preceding and succeeding the interaction may be applied. For two vehicles this results in a maximum of four constraints, which can be used to define a projective transformation.

Due to the abstract trajectory generation procedure introduced above, it may not be obvious if an intersection in the paths of two vehicles will lead to collision. Furthermore, vehicles deviating from their paths due to disturbances, such as the force introduced by string tension, may lead to collisions even where paths are not crossing. Thus, a system was implemented to avoid collisions of vehicles with each other or objects in the environment.

The implemented system places a virtual linear spring constant, k, around a set of simple 3D primitive shapes that are used to model points of influence. The simple 3D primitives are constructed from a normal displacement field, r, from a three dimensional point, line or plane, creating in three dimensional space, a sphere, cylinder and rectangle respectively. Quadcopters are modelled as points giving a spherical region of influence. Each object is registered to the controller. Each controller cycle, all controlled object combinations are checked for a displacement vector, x, and compared with the objects maximum displacement radius, $r_{rmax}$. Limiting the radius of influence ensures disturbances can't propagate throughout the dynamically linked system. Objects that fall within the displacement field create a normal force, F, away from the object subject to the spring constant equation:

$$F = -kx$$

The displacement is normalised to the displacement magnitude, x=0 when $r > r_{max}$ and x=1 when r=0. A new trajectory vector is set by the summation of the ratio of the object imposed vector and the trajectory vector, T:

$$F_N = kx + (k-1)T$$

where $F_N$ is the new force. For multiple object interactions each generated $F_N$ is summed with its corresponding k:

$$\sum_{N=1}^{object} F_N \frac{k}{k_T}$$

where $k_T$ is the summation of all virtual spring constants. This allows the system to gracefully change from its assigned trajectory to an avoidance one. Multiple agents can interact with each other without one main agent.

3. Experimental Setup

Figure 12:
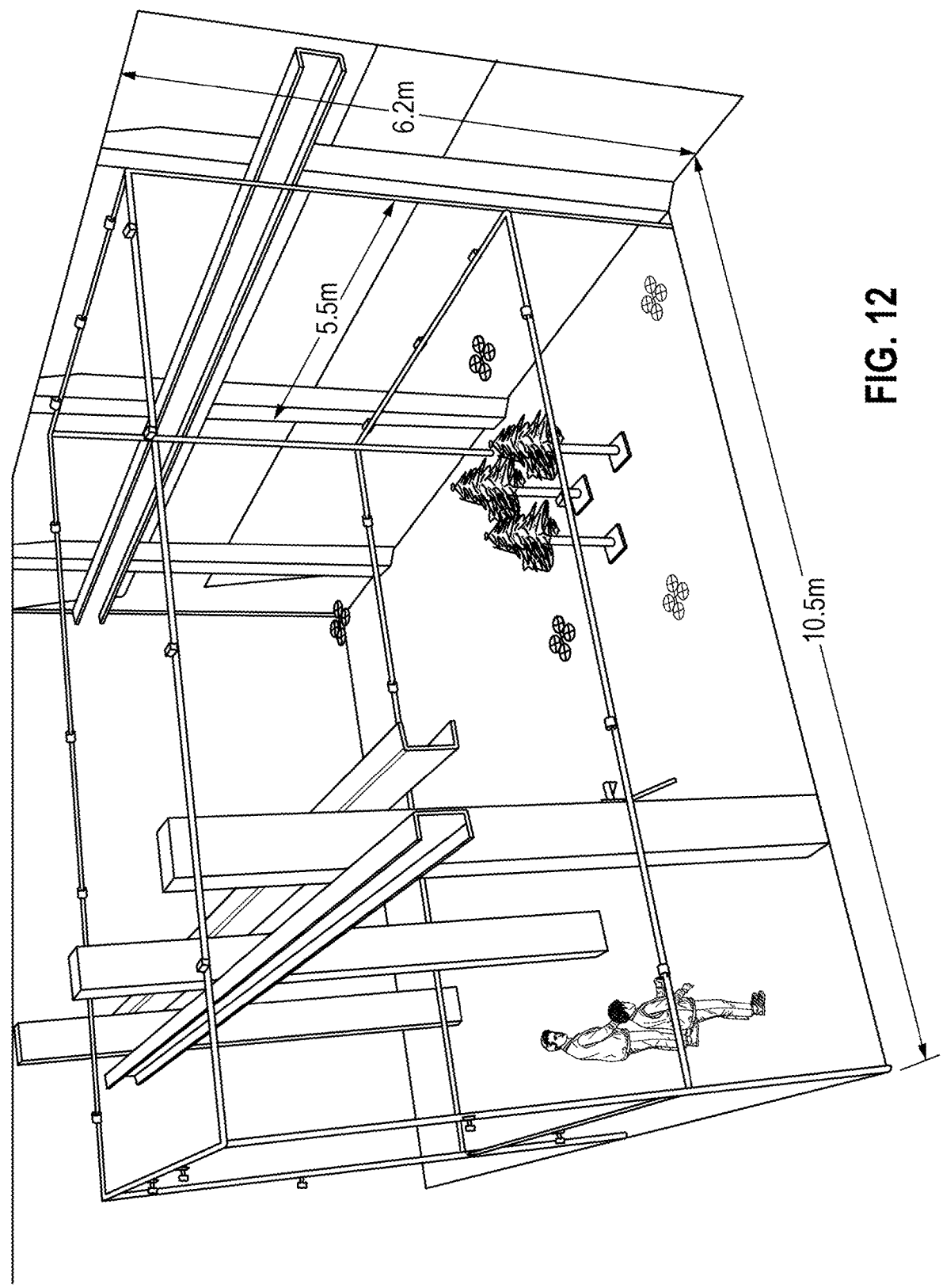
FIG. 12 illustrates an example of a flying space.

The flight arena in the Aerial Robotics Laboratory at Imperial College London is a protected area of 5.5 m by 10.5 m, with a maximum effective flight altitude of 6.2 m. The arena is equipped with 16 Vicon T40-S cameras, each with a sensor resolution of 4 megapixels and system update rate of 400 Hz. The system is capable of tracking retroreflective markers or near-IR LEDs to sub-millimetre accuracy throughout the available flight space, providing high accuracy ground-truth localisation for as many individual objects as required. In addition to this equipment, we also simulate the fixed anchor points we may expect to use in a natural or industrial environment, such as tree branches in a forest canopy and metal pipes in an industrial plant. To create a representative parallel we add the supports in the form of metallic pipes and artificial coniferous trees to the arena, each mounted on a fixed base to provide anticipated surfaces 1 to 2 meters above the arena floor. FIG. 12 conceptually illustrates the Flight Arena at the Aerial Robotics Laboratory.

The motion capture system supplies state estimation of the aerial vehicles in the form of three lateral displacements and the yaw angle of each. A Kalman filter was applied to the horizontal displacements to estimate the velocity of the vehicles. Assuming linearisation of the system in near hover a cascaded PID controller acting on both vehicle position and velocity was implemented to act on the horizontal degrees of freedom while a simple PID and PD controller was applied to the altitude and yaw degrees of freedom respectively. A system was devised to halt all vehicles in their current position should one vehicle deviate from its path by more than 40 cm. Upon return to within 10 cm of its desired location all vehicles were to continue their trajectory. In order to build an autonomous flight control scheme of sufficient accuracy, as well as interfacing with the external ground-truth data provided by the Vicon system, we require a relatively open Application Programming Interface (API) in order to build a robust interface with each drone in the swarm.

Following a comprehensive review of the state of the art and market availability, we found only one commercially available system appearing to suit the needs of this task. The Crazyflie nanoquadcopter Bitcraze has an overall span of 9 cm, a 32 bit ARM Cortex M3 microprocessor for flight control, a high-quality inertial measurement unit (IMU) consisting of a 3-axis accelerometer, gyroscope and magnetometer, and a barometer to together provide 10 degree of freedom state measurement. As with virtually any method of pressure measurement operating in non-static flow across small altitude fluctuations, accuracy is relatively poor and thus altitude data is derived entirely from the Vicon measurements. Each drone weighs 18.8 g with a 170 mAh lithium polymer (LiPo) battery, providing around 7 minutes of effective hover time when no additional payload is added.

4. Results and Discussion

Figure 13:
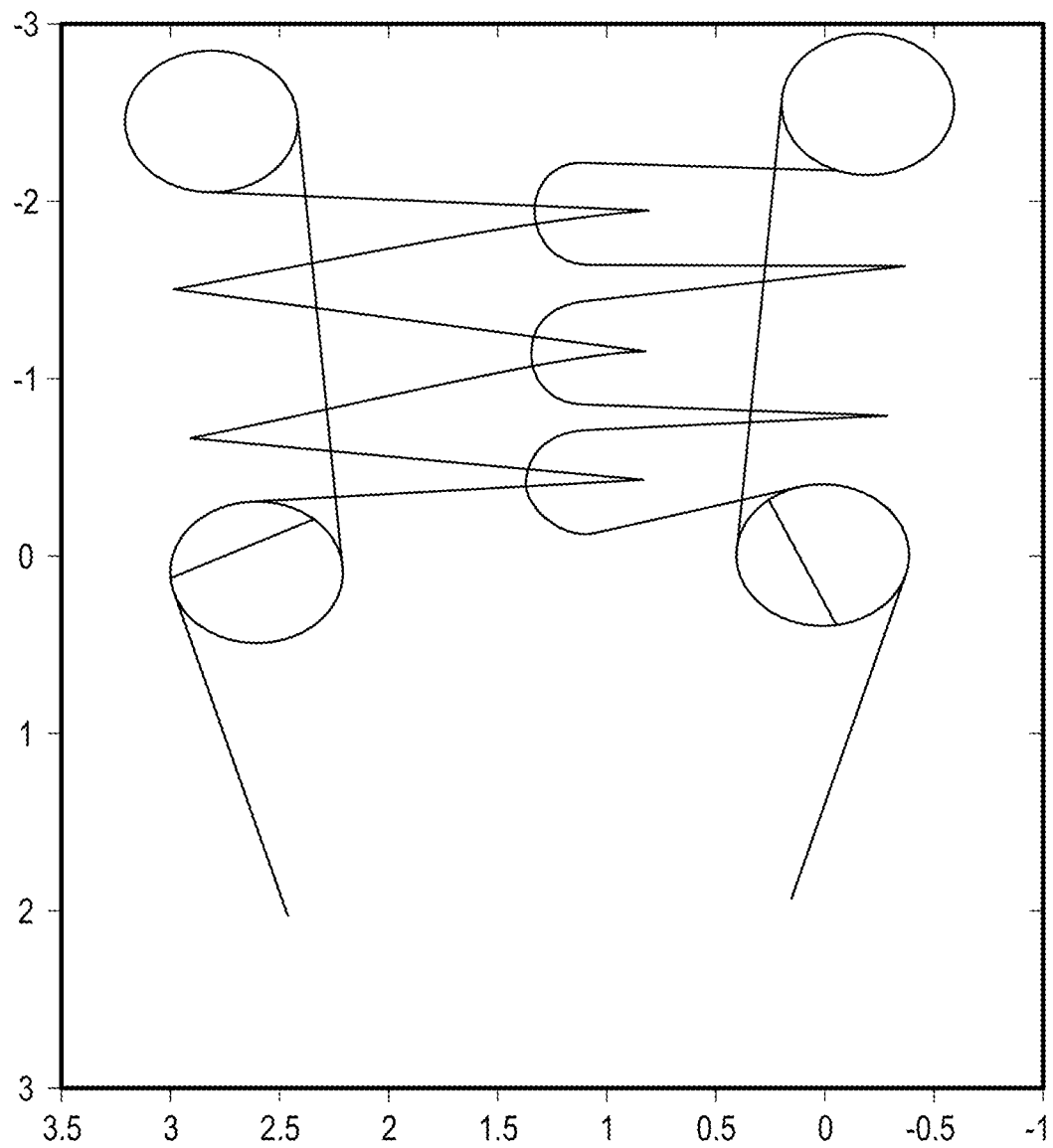
FIG. 13 illustrates the trajectories of two NAVs.

The trajectory, as observed by the Vicon system, of two NAVs throughout the construction is shown in FIG. 13. Deviations from the desired flight path of up to 0.4 m during construction stages are attributed to the intentional softness of the position controller during these phases of flight; as intended, stability is maintained throughout despite significant tensile forces in the structural elements and the accuracy in directions of interest is maintained within 0.05 m during all mission-critical manoeuvres, including initial connection of the supporting nodes in all three spatial axes and the trajectory altitude about the apex of the linking node.

Thrust measurement of a single NAV motor achieved a peak thrust of 73.8 mN during free flight with no significant environmental interactions such as ground or ceiling effect. To assess available hover time, we commanded a single drone to maintain an altitude of 2 m and a fixed horizontal hover position and heading until it was incapable of maintaining this hover due to the draining battery; across 10 trials, we achieved an average of 420 seconds (±10%), with a 170 mAh single-cell 3.7V lithium-polymer source when no payload was added. When loaded with our construction and perching payloads, the available hover time was reduced to 350 seconds (±12%) and 310 seconds (±14%) respectively. Complete construction of a structure as described here takes around 120 seconds, well within the capability of these platforms even allowing for up to 90 seconds of travel in each direction before building commences.

When perched, we measure the current draw of the NAV whilst maintaining a constant altitude at 9.7 mA, rising to 100 mA when actively ascending along the suspending thread. We successfully demonstrate flights of perching NAVs consisting of an 80 second hover to simulate travel, 1 hour of perching on a web constructed by two other NAVs (FIG. 13), and a further 80 second hover after dismounting before the battery cell is unable to supply sufficient power to maintain further flight.

Assuming identical travel before reaching the target hover position, this represents an overall jump is hover duration from 260 seconds for an unloaded NAV maintaining active flight to over 3600 seconds whilst perched on the assembled aerial structure—an increase of nearly 1300%, aptly demonstrating the potential to prolong the effective mission time of inspection or monitoring tasks using the principles we propose.

There has been shown the feasibility and range of application of aerial construction using sub-10 cm multi-rotor NAVs and multiple tensile structural elements. There has been discussed the methods of securely mounting the web structure to the environment as supporting nodes and assembling multiple components as linking nodes. A mechanism by which an NAV may perch on the assembled structure has been discussed, implemented and assessed, leading to a dramatic increase in overall flight endurance compared to active hovering The work may be extended to encompass more complex structures, with more anchor points and greater loading capacity to allow higher numbers of perched NAVs. We also expect to investigate applications for this technology, including the mounting of environmental sensors on perched NAVs and applicability in non-natural environments.

Whilst the invention has been described in connection with various embodiments, it is to be understood that the invention is not limited to these embodiments, and that alterations, modifications, and variations of these embodiments may be carried out by the skilled person without departing from the scope of the invention. For example, in some embodiments the robotic device or quadcopter may be arranged to pick up objects and affix them to target sites using an adhesive delivered from a dispensing assembly, as described above. For example, although not shown in the drawings, it is envisaged that the quadcopter may include a gripping arm or similar object manipulator that may be arranged to manipulate or otherwise pick up objects from the environment.

The gripper may be under control of the quadcopter's on-board processor. Thus, using the on-board imaging means or camera module, the processor may control the flight of quadcopter to position quadcopter relative to the object to allow gripping or handling of the object. For example, using the on-board cameras, the processor may process image data of the surrounding environment, to identify an object relative to quadcopter. Quadcopter may then fly towards the identified object such that the gripper may then be in a position to grasp object.

The process for affixing the grasped object to a target site is then similar to that described above in connection with string. For example, dispensing assembly dispenses adhesive onto target site, following which quadcopter brings the grasped object into contact with the adhesive prior to full curing, to affix the object to the target site.

The following section relates to 3D Printing with Flying Robots.

Graham Hunt, Faidon Mitzalis, Talib Alhinai, Paul A Hooper, Mirko Kovaè (1)

Abstract—Extensive work has been devoted recently to the development of 3D printing or additive layer manufacturing technologies, as well as to the field of flying robots. However, to the best of the authors knowledge, no robotic prototype has been presented so far that combines additive layer manufacturing techniques with aerial robotics. In this paper, we examine the feasibility of such a hybrid approach and present the design and characterisation of an aerial 3D printer; a flying robot capable of depositing polyurethane expanding foam in mid-flight. We evaluate various printing materials and describe the design and integration of a lightweight printing module onto a quadcopter, as well as discuss the limitations and opportunities for aerial construction with flying robots using the developed technologies. Potential applications include ad-hoc construction of first response structures in search and rescue scenarios, printing structures to bridge gaps in discontinuous terrain, and repairing damaged surfaces in areas that are inaccessible by ground-based robots.*

*See video attachment

This work was done at the Aerial Robotics Lab, Imperial College London (1) Corresponding author m.kovac@imperial.ac.uk I. Introduction 3D printing or additive manufacturing has seen great development in recent years and has become an established method of manufacturing with many applications. However, 3D printing typically requires a fixed size printer with a limited printing envelope. The size of the parts produced are therefore limited by the size of the printer itself and in most cases scaling up the printer is impractical and costly.

This paper examines the feasibility of an aerial 3D printing robot (shown in FIG. 14) that overcomes restrictions in the size of the printed structure and allows a significant amount of flexibility in printing location. The material deposition is performed by a quadcopter carrying an on-board printing system and depositing material whilst in motion. This allows it to print three dimensional structures in areas normally inaccessible by ground or climbing robots with a variety of maintenance and repair applications.

The use of mobile robots that deposit material is a new area of research and, to the best of our knowledge, a flying 3D printing robot has not been presented so far. However, extensive research has been carried out on the two parts of the system individually, mobile airborne robots and material deposition systems for 3D printers.

One approach of additive manufacturing techniques best suited for the needs of the project is fused deposition modelling (FDM) [1]. FDM uses extruded thermoplastic or wax from a heatable extrusion head to trace out the solid areas of the physical models. The extrusion head can move on the horizontal plane depositing very thin beads of molten material on a heated platform. Vertical motion of the platform allows subsequent layers to be printed using the same procedure [2]. Unlike other methods, such as stereolithography or selective laser sintering, FDM does not require a pool of material and is therefore more suitable for unrestricted deposition in three-dimensional space.

MAVs (Micro Air Vehicle), such as quadcopters, allow for accurate positioning and flexibility of motion in all three directions to facilitate material deposition. The current state in mobility and control of quadcopters shows that advanced flight and control has been achieved [3]-[7], and the navigation and localisation can be achieved with current technology [8]-[11].

In the pursuit of large scale automated construction, a promising example of an alternative 3D printer has been developed by [12], where one of the solutions involved depositing concrete using a gantry robot. A second approach to create mobile construction robots is a swarm of remote controlled ground vehicle developed by [13, 14], able to construct a ramp using various amorphous materials. Other examples of robotic fabrication using amorphous materials includes the use of thermoplastic adhesives to build robotic building tools [15] and spider inspired drag lines [16]. Further examples of automated construction involved assembling prefabricated components using quadcopters [17, 18].

In comparison to existing systems, the solution we propose combines a trajectory guided quadcopter with an onboard printing system to simulate the printing head of a conventional 3D printer. The quadcopter allows flexibility in positioning of the printing nozzle in all three dimensions. A material of high viscosity is required for deposition in order to retain the shape followed by the moving robot. The geometry of the printed structure can be altered by controlling the path and dynamics of the robot and an advantage of an aerial robot, in contrast to a ground system, is that it can reach high elevations easily and build 3D structures in inaccessible or hazardous areas.

II. Printing Material

A promising printing method to integrate on a flying platform is a system that resembles Fused Deposition Modelling techniques that are used in conventional 3D printers. The material is deposited in a very viscous liquid form and cures upon extrusion from the printing nozzle. Using this technique the printed geometry depends on the path followed by the printing nozzle. Hence the robot itself, and the flow rate of the material can control the printed geometry. A major challenge is to choose a suitable material for successful integration on the flying robot.

A. Material Selection

The feasibility of a controllable, lightweight printing system largely depends on the material used for printing and the main properties that were considered in selection are listed below.

1) Density of the printing material
2) Curing time
3) Material strength after solidification
4) Expansion of the material after curing
5) Cost Based on a comparison (Table I) we concluded that two part polyurethane (PU) foam is the best solution, providing a large volume expansion in a short time scale. PU foam consists of two components, component one contains polyetherols, flame-retardant, silicone, catalyst and blowing agents (Chemical A) and the second component is a diisocyanato diphenylmethane (MDI) based composition (Chemical B). The main advantage of two part polyurethane expanding foam is the very large expansion during solidification, approximately 25 times its initial volume. In this way a small volume of material can be carried on the flying platform, expanding to a considerably larger volume of printed structure after deposition. Additionally, using two part liquid solutions, the two chemicals are stored separately which ensures that the material is in a non-reacting state before the printing process is initiated. Furthermore, a refilling system can potentially be achieved by pumping liquid inside the two containers, a process which could be performed autonomously by the robot. The material is also self-adhesive and can be applied to a wide variety of surfaces. A significant challenge using the two part polyurethane foam is achieving high quality mixing and a high viscosity solution on-board the robot with a lightweight printing system.

B. Material Testing

We performed preliminary testing of the material to determine the design requirements of the printing system for high quality printing. The main parameter was the time required for the two liquids to react and start producing foam.

A static mixing nozzle was used to mix the two chemicals. In the first tests, the two chemicals were well mixed when leaving the nozzle but the mixture was still in liquid form when it was deposited. A more viscous, foam form was required for printing to avoid the material spreading on the surface, producing undesirable results. The module design was altered to introduce a reaction chamber after the mixing nozzle, where the two chemicals are held until they fully react and produce foam. Material deposition starts after the foam starts forming, when the material is in a very viscous state allowing for the shape to be maintained after printing.

To determine the required reaction time we deposited foam samples with a time of 45 s, 60 s, 75 s and 90 s on a 30° inclined slope and its shape changed until full hardening (FIG. 15).

III. Design

The design method followed was to divide the system into the printing module and the mobility platform. The printing module delivers the material in a highly viscous form and deposits the material at the position of the printing nozzle. Using the quadcopter platform the robot can move to the required location and follow the path required to form the intended geometry by depositing material along its way.

TABLE I

MATERIAL COMPARISON

| Material | Density kg/m³ (after expansion) | Expansion | Curing Time | Heating Required? |
|---|---|---|---|---|
| Single Part Polyurethane Foam | 3 | 24 times | 4 hours | No |
| Two Part Polyurethane Foam | 48-50 | 25 times | 15 mins | No |

TABLE I-continued

MATERIAL COMPARISON

| Material | Density kg/m$^3$ (after expansion) | Expansion | Curing Time | Heating Required? |
|---|---|---|---|---|
| Thermoplastics (ABS) | 1,042 | 1 times | 5 s | Yes |
| Two Part Epoxy Adhesive | 250 | 1 times | 24 hours | No |
| Hot Glue | 960 | 1 times | 1 min | Yes |

A. Printing System

From the materials considered, two part polyurethane expanding foam was chosen as the most appropriate material for the application. The processes required by the printing system for polyurethane foam are, storing the two chemicals in separate containers, delivering and mixing the chemicals on-board the quadcopter, and finally depositing the material through a printing nozzle. The process and timings are summarised in FIG. 16.

A major design criterion of the printing system was the mass of the system. To achieve continuous steady flight, the maximum payload of the quadcopter is approximately 500 g. Additionally, ease of manufacture was a key aspect in the design as many parts of the system had to be replaceable to avoid clogging, especially in places where the mixture could potentially solidify prior to deposition. The main design criteria are summarised in Table II, focusing on low cost, robustness and low weight.

TABLE II

DESIGN CRITERIA FOR PRINTING SYSTEM

| Criterion | Aim | Importance (1 to 5) |
|---|---|---|
| Total Mass | <130 grams | 5 |
| Cost of Materials | Less than £5 (excluding actuators) | 2 |
| Ease of Manufacture | Use standard parts | 4 |
| Compact | Fit on quadcopter base | 5 |
| High Toughness | Limit damage upon impact | 2 |

Figure 17:
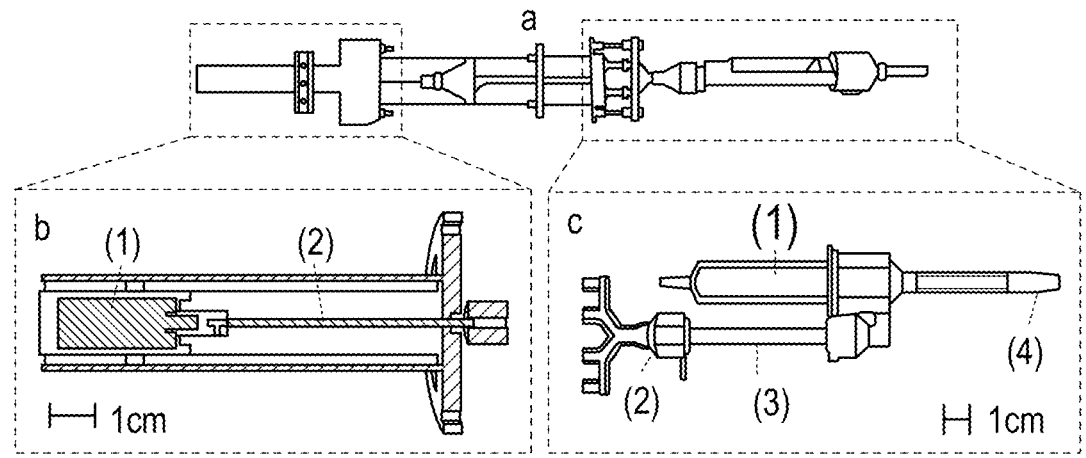
FIG. 17 shows a complete printing module with a CAD breakdown of components. a: Printing module b(1): Micro geared motor b(2): M2 Lead screw c(1): Buffer chamber for chemical reaction process c(2): Customized chemical mixing junction, c(3): Mixing nozzle, c(4): Printing Nozzle.

The assembly of all the components of the printing system is shown in FIG. 17. The major component assemblies within the module are discussed individually in the following sections.

Figure 18:
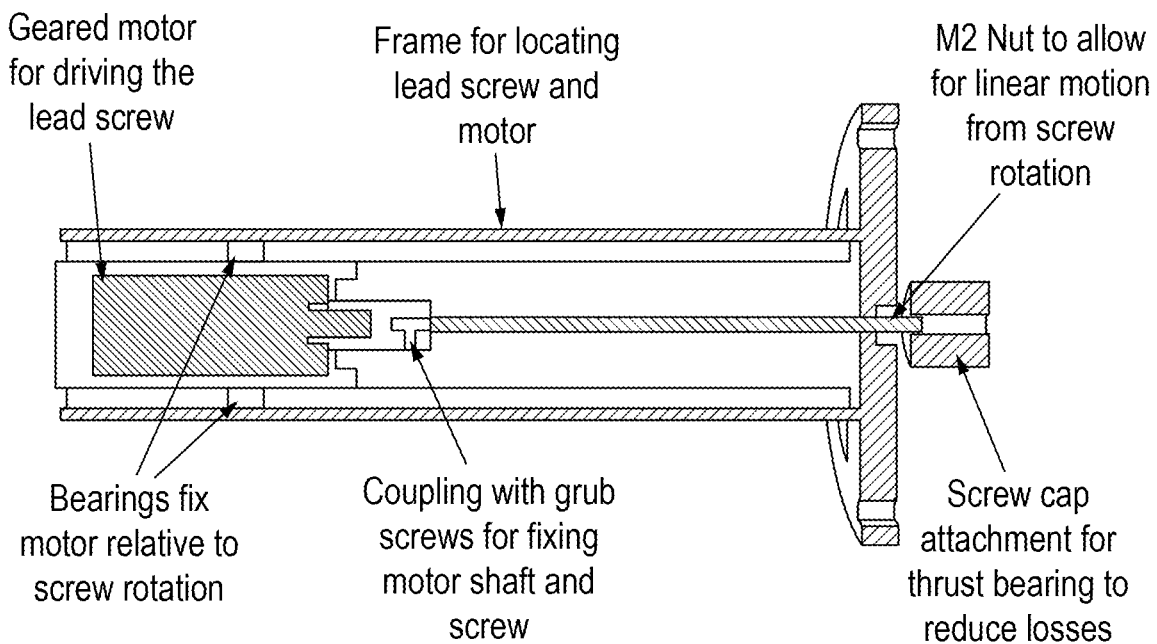
FIG. 18 shows a CAD render cross-section of delivery actuator for mixing chemicals A and B. A lead screw design is utilised to provide linear actuation of the two storage container plungers.

1) Delivery System:

The two chemicals are stored in two separate containers. The containers used are two 5 mL syringes which can also be used to pump the liquid out using the plunger. Manufacturing modifications have to be made to the syringes used in the system in order to reduce weight. The configuration of the delivery actuator is shown in FIG. 18.

Essential for accomplishing good mixing quality is to ensure that the flows of Chemical A and Chemical B are equal, as a consistent 1:1 mixing ratio is required. To achieve this a lead screw design was utilised to provide the linear force to move the syringe plungers. The screw is driven by a motor and the power required for this motor is matched to the force required to move both container syringes. The two 5 ml syringes are placed parallel and inline with the lead screw and the force is applied to both plungers equally. This is a powerful lightweight solution that ensures that the flows of the two chemicals are equal. The mass associated with each component is listed in Table III. This shows there is an additional 250 g of capacity for increasing the chemical payload, from the current 5 ml of each component (~10 g), with minor adjustments to the structural design.

TABLE III

WEIGHT BUDGET

| Part | Weight (g) | Manufacturing |
|---|---|---|
| Delivery Module | | |
| Micro geared motor | 10 | Commercial Component |
| M2 Lead screw | 2 | Commercial Component |
| Minature bearings (2x) | 1 | Commercial Components |
| Housing | 11 | 3D Printed PLA |
| Component Syringe (2x) | 5 | Commercial Component |
| Lead screw attachment | 2 | 3D Printed PLA |
| Disposable Components | | |
| Mixing Nozzle | 3 | Commercial Component |
| Mixing Junction | 3 | 3D Printed PLA |
| Foam Junction | 5 | 3D Printed PLA |
| Reaction Chamber | 4 | Commercial Component |
| Printing Nozzle | 1 | 3D Printed PLA |
| Other | | |
| Mounting rig and electronic components | 157 | — |
| Miscellaneous (Rubber tubing, thread, wiring | 28 | — |
| Total | 232 | — |

Figure 19:
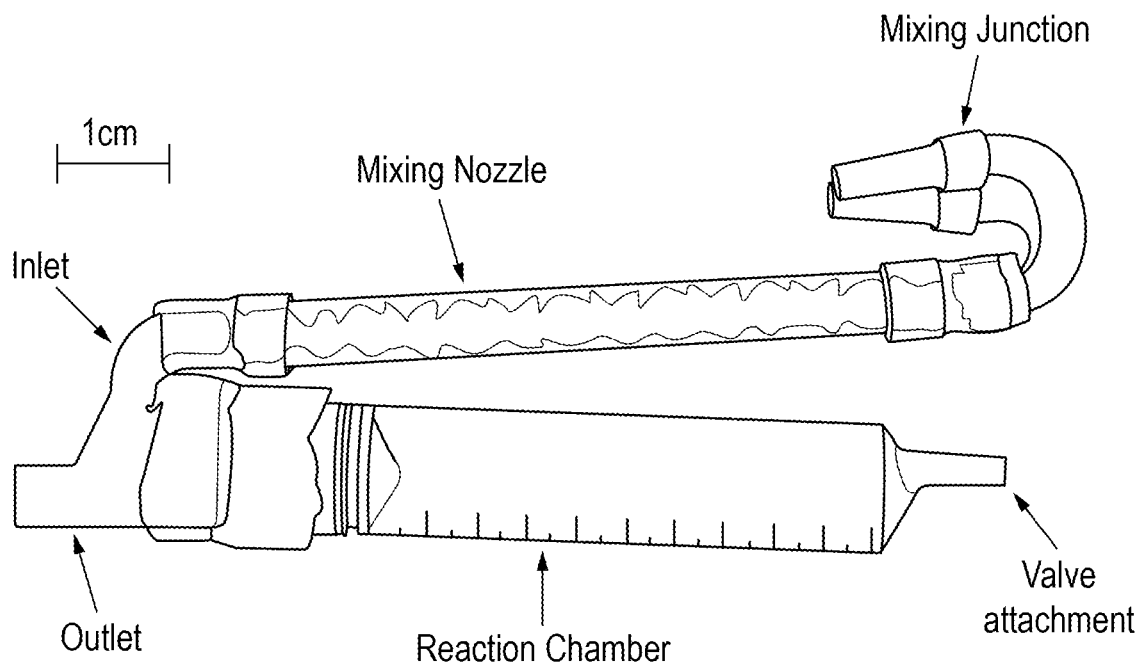
FIG. 19 shows a Reaction Chamber plus the foam junction which leads to the printing nozzle. The foam junction also has an intake port through which mixed components are delivered from the mixing nozzle.

2) Mixing Components:

The two chemicals are mixed by joining the flows with a custom design Y-splitter and pumping them through a disposable mixing nozzle (FIG. 19). The mixing nozzle is a static mixer, whose internal geometry enhances mixing of the two chemicals. At the exit of the mixing nozzle the two chemicals are fully mixed.

Testing showed that mixing of the two chemicals using the static mixer is satisfactory. However, the mixture is still in liquid form and not viscous enough for deposition. In that form the printing material would spread on the surface it is deposited on. To overcome this problem and produce the foam prior to deposition, more time is needed for the two chemicals to react 3) Reaction Chamber.

In order to provide more time for the two chemicals to react, the mixture is held in a reaction chamber until the mixture starts taking the required form. Material testing showed that approximately 90 seconds after the flow initiates the mixture is of an adequate viscosity for deposition. Until that time the mixture is held in the reaction chamber.

The reaction chamber is constructed from a 10 mL syringe, one side has two lines connected the inflow and outflow of the mixture. The other side is used to pressurise the syringe using an air pump. When foam starts forming and the material is ready for deposition, air is pressurised in the syringe so the material is pushed through the outflow to the printing nozzle. The reaction chamber is shown in FIG. 19.

4) Nozzle Valve:

A single valve is required on the printing nozzle to prevent outflow of the chemical mixture prior to complete mixing and reaction. Due to weight restrictions pinch valves, which would be suitable for the application, could not be used. Hence, we designed a custom valve system to block and release the flow. The valve system uses a servo to pull and bend the silicon tubing to block the flow of air and foam by forming a seal against the printing module support.

5) Printing Nozzle:

The last component of the printing system is the printing nozzle. Various shapes can be used for the printing nozzle depending on the required shape of the foam. We designed a simple nozzle that ensures the material is deposited in a laminar fashion in order to optimise the accuracy of the final release of foam.

B. Aerial Platform

The printing system has been designed to be attached to the 3DR ArduCopter Quad. The quadcopter has an on-board processor (ArduPilot), three axes accelerometer, three axes magnetometers and speed controllers on all four brushless motors. For accurate localisation in the flight arena, we use a 3D motion tracking system with 16 Vicon T40 cameras [19]. A separate off-board controller uses the tracking coordinates from the Vicon system and transmits commands at a frequency of 50 Hz to the on-board processor to control its position.

The flight stability and accuracy required is a major challenge, however the focus of this paper is on the automated foam deposition mechanism and not on the control of the platform. The underactuated nature of the quadcopter [20], the significant payload from the printing module (~300 g) and minor imbalances in mass distribution render the system challenging to control. For flight control, a cascaded PID controller was used [21] that is specifically developed for this platform. Accuracy within 10 cm in all three translational directions was achieved, which was sufficient for successful printing results. Significant improvements in the results are expected if a more advanced controller is adopted such as optic flow stability based flight control. Future work will address the integration of the presented printing module on a flying robot with on-board flight control and navigation that would not rely on a motion tracking environment.

Extensive testing of the system showed that the effects of the downwash and the distance from the ground do not significantly affect the precision of the print. The speed of deposition suggests that the entirety the print is within a small region even if the robot is drifting around the target position while depositing, this is shown in the video attached.

IV. Integration

The printing module must be integrated into the quadcopter system in a manner which is robust and does not compromise the performance of the robot.

A. Mounting

Figure 20:
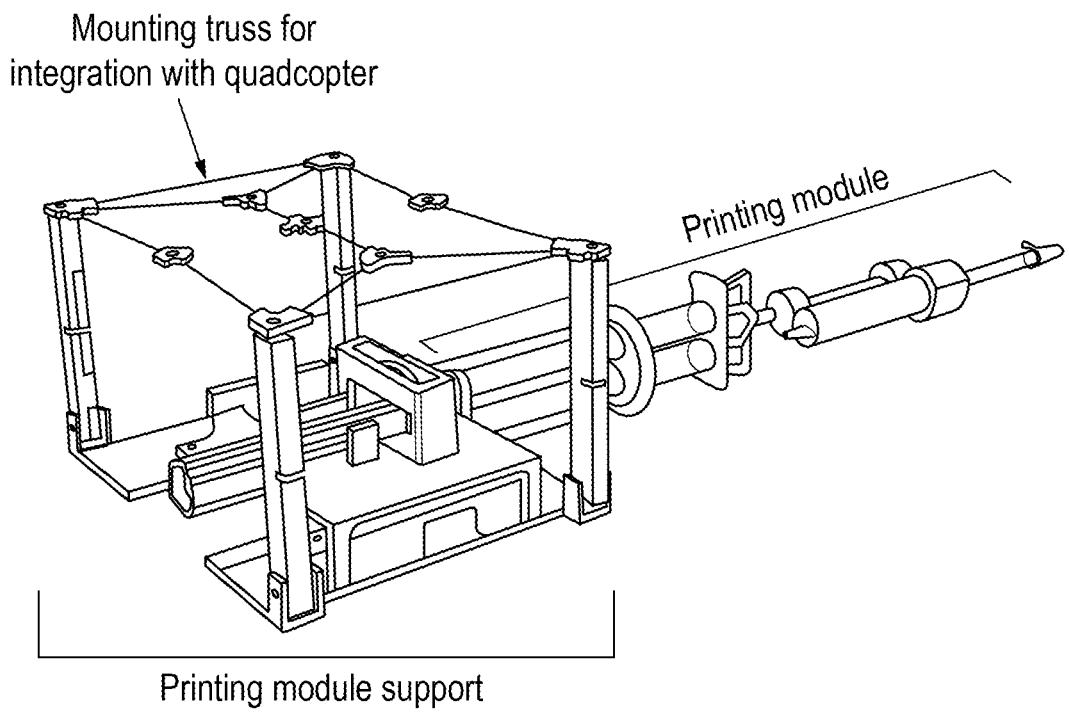
FIG. 20 shows a CAD Model of a printing module attached to mounting rig.

In order to mount the printing module on to the quadcopter a rig was designed (FIG. 20). The rig has two main functions, firstly it acts to attach the printing module to the base of the robot. The rig is designed such that there is a clearance between the quadcopter's legs and the base of the module. This is intended to prevent any damage to the module during landing or in the event of unexpected failure during flight.

Figure 21:
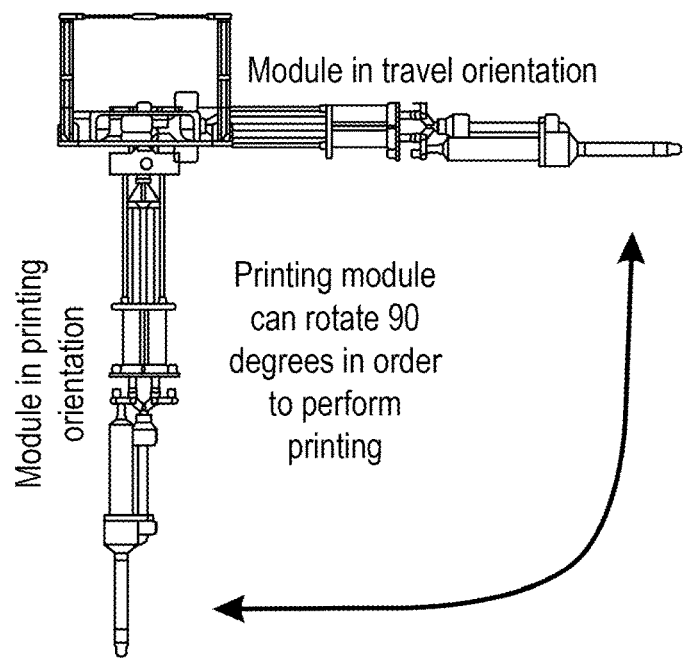
FIG. 21 shows that the module is held vertically to perform a print operation and is held horizontally for travelling and landing.

Secondly the rig also allows for the rotation of the printing module (FIG. 21). This rotation is performed by a servo actuator fixed onto the mounting rig enabling vertical alignment during a printing operation. This orientation increases the robot's ground clearance during printing, reducing turbulent ground effects leading to improved deposition accuracy. Travelling to the print position and landing however is impractical with the module in this orientation, therefore the module is rotated to the horizontal, bringing it to a secure position before and after performing a print.

B. Dynamic Coupling of the Combined System

The printing module represents a mass at a location displaced from the quadcopter centre of mass. This produces an imbalance in the system which the controller must continually account for. In addition to this, the movement of the printing arm from horizontal to vertical position, or vice versa, upsets the stability of the quadcopter during hover. The controller responds to this input and the response can be seen in the supplementary video. To account for this issue, printing is delayed until the controller has responded and the quadcopter is stable again within predefined limits. In the future a more advanced controller could be implemented to reduce the effect of on-board movements.

V. Results

We demonstrated the feasibility of an aerial 3D printer by performing airborne depositions using predefined flight paths tracked via a 3D motion capture system. In this section, we present the results and performance characterisation of the printing mechanism and the integrated aerial 3D printer robot. Further, we describe two printing scenarios and discuss the opportunities and limitations of the developed aerial 3D printing technologies for construction with flying robots.

A. Scenario 1: Bridging Gaps in Terrains

Figure 22:
FIGS. 22 (a1)-(a4) shows the static deposition of material between an 18 mm gap. (a4) shows the gap was successfully bridged; (b1)-(b4) shows the static deposition on a damaged wooden beam. (b4) shows how after a single print the damage has begun to be rectified by the robot; (c1)-(c3) shows comparison of static and airborne deposition accuracy. (c1) is a result whilst the robot is grounded, (c2) and (c3 shows a first and subsequent deposition whilst the robot is airborne.
Figure 22:
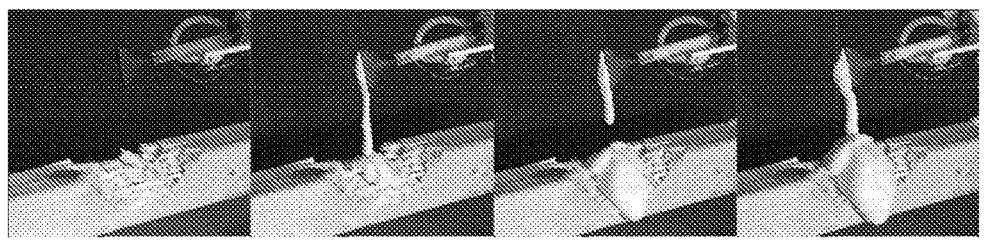
Figure 22:
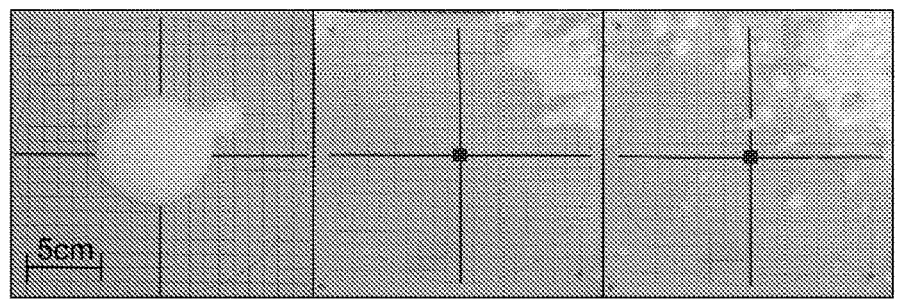

This scenario illustrates gap filling properties of the 3D printing method. The experimental setup consists of two suspended aluminium beams of a width of 25 mm separated by an air gap of 18 mm. This setup abstracts a crack that needs to be bonded by the 3D printing robot. We performed five consecutive static depositions: twice on each aluminium beam and a final fifth print to further reinforce the bridged gap. The air gap between the beams was bridged after the second deposition (FIG. 22a). Transitioning this to an airborne solution is now only dependent on the quality of flight controller.

The two beams were connected by a polyurethane foam bridge of cross-sectional area 1300 $mm^2$. To characterise the strength of the bridge, we used a multi-axis load cell to measure the force required for fracture. The maximum load recorded was 153.9 N, corresponding to a yield stress of 118.0 kPa. Assuming that the tensile behaviour scales linearly, the same depth of foam printed along a metre long gap of width 1 mm, the structure could withstand loading up to roughly 7.5 kN.

B. Scenario 2: Repairing Damaged Structures

As a demonstration of repairing damaged structures with the aerial 3D printing method developed in this paper, the second scenario consists of a damaged wooden beam and the foam printing mechanism that is held fixed above it. This experiment illustrates a potential scenario where a quadcopter prints foam over a damaged structure in access denied terrain to repair it. The results (FIG. 22b) show that the foam is successfully used as filling material for the wooden beam. After hardening for five minutes it forms a rigid closed cell foam structure that adheres solidly to the wooden beam, indicating that the mechanism design and integration methods are successful as well as that polyurethane foam can be used as filling material for wooden structures. Again, achieving this result for an airborne deposition in the future would only be dependent on the establishing the required flight control.

C. Characterisation of Deposition Accuracy

Two successful prints are performed on a target (FIG. 22c) and a compared to a print with the suspended mechanism. The results show that aerial 3D printing is achieved. The accuracy is shown to be highly dependent on the stability of the flight and is also affected by the downwash from the propellers. Printing within a 10 cm radius has been achieved (FIG. 22c (2 & 3)) and with increasing flight stability, the accuracy of a static deposition described in the aforementioned scenarios can be approached (FIG. 22c (1)).

VI. Discussion

Possible related applications of the scenarios presented involve bridging air gaps to allow for land robots to overcome difficult terrain or to insulate and hold together overhead power lines during natural disasters. The range of applications of such an aerial 3D printer are very rich and span from local repair of damaged surfaces to construction of entire three dimensional structures. Combining the presented mechanism with swarm control and special navigation schemes, such as simultaneous localisation and mapping (SLAM), could allow for autonomous detection and repair using swarms of aerial printers. The main limitations are, low material capacity due to the relatively small payload capacity and limited battery life of the quadcopter, as well as inability to regulate and stop a printing cycle halfway through to move on and print at another location. Nevertheless, the current system proposes successful mechanical integration and methods for aerial printing with polyurethane foam and demonstrates a future for additive layer manufacturing in combination with aerial robots.

VII. Conclusion and Future Work

In this paper, we presented the design and characterisation of an aerial 3D printer capable of depositing polyurethane foam to create structures in mid flight. Through two different scenarios, we demonstrate the capabilities and potential applications of this technique. Based on the characterisation and successful integration of a 3D printing module on a quadcopter, we conclude that aerial 3D printing is a promising new addition to the field of aerial construction. The major limitation of this construction technique is the limited payload of flying robots. Improved flight stability will allow more accurate deposition to facilitate printing of structures at tighter tolerances. Future work could therefore focus on multi-vehicle coordination to enable the construction of larger structures and automating the raw component refilling process to shorten intervals between successive prints. Adapting the system for different materials can further expand the applications of the system.

VIII. Acknowledgement

The authors gratefully acknowledge the Department of Aeronautics at Imperial College London and The Engineering and Physical Sciences Research Council (EPSRC) for their support of this work. Any opinions, findings, and conclusions or recommendations in this material are those of the authors and do not necessarily reflect the views of the aforementioned entities. Talib Alhinai thanks the Abu Dhabi Investment Authority (ADIA) for financial support.

REFERENCES

[1] Ian Gibson, David W Rosen, and Brent Stucker. *Additive manufacturing technologies: rapid prototyping to direct digital manufacturing*. Springer, 2010.
[2] C J Luis Perez. Analysis of the surface roughness and dimensional accuracy capability of fused deposition modelling processes. *International Journal of Production Research*, 40(12):2865-2881, 2002.
[3] Sergei Lupashin, Angela Scholig, Michael Sherback, and Raffaello D'Andrea. A simple learning strategy for high-speed quadrocopter multi-flips. In *IEEE International Conference on Robotics and Automation (ICRA)*, 2010, pages 1642-1648.
[4] Aleksandr Kushleyev, Vijay Kumar, and Daniel Mellinger. Towards a swarm of agile micro quadrotors. In *Robotics: Science and Systems*, 2012.
[5] Korbinian Schmid, Teodor Tomic, Felix Ruess, Heiko Hirschmuller, and Michael Suppa. Stereo vision based indoor/outdoor navigation for flying robots. In *IEEE/RSJ International Conference on Intelligent Robots and Systems (IROS)*, 2013, pages 3955-3962.
[6] Daniel Gurdan, Jan Stumpf, Michael Achtelik, K-M Doth, Gerd Hirzinger, and Daniela Rus. Energy-efficient autonomous four-rotor flying robot controlled at 1 khz. In *IEEE International Conference on Robotics and Automation*, 2007, pages 361-366.
[7] Nathan Michael, Daniel Mellinger, Quentin Lindsey, and Vijay Kumar. The grasp multiple micro-uav testbed. *Robotics & Automation Magazine, IEEE*, 17(3):56-65, 2010.
[8] Markus Hehn and Raffaello D'Andrea. Quadrocopter trajectory generation and control. In *IFAC World Congress*, pages 1485-1491, 2011.
[9] Korbinian Schmid, Michael Suppa, and Darius Burschka. Towards Autonomous MAV Exploration in Cluttered Indoor and Outdoor Environments. *RSS 2013 Workshop on Resource-Efficient Integration of Perception, Control and Navigation for Micro Air Vehicles (MAVs)*, 2013.
[10] Charles Richter, Adam Bry, and Nicholas Roy. Polynomial trajectory planning for quadrotor flight. In *International Conference on Robotics and Automation*, 2013.
[11] Matthew Turpin, Kartik Mohta, Nathan Michael, and Vijay Kumar. Goal assignment and trajectory planning for large teams of aerial robots. In *Proc. Robotics: Science and Systems*, 2013.
[12] Sungwoo Lim, Richard A. Buswell, Thanh T. Le, Simon A. Austin, Alistair G F Gibb, and Tony Thorpe. Developments in construction-scale additive manufacturing processes. *Automation in Construction*, 21:262-268, 2012.
[13] Nils Napp, Olive R. Rappoli, Jessica M. Wu, and Radhika Nagpal. Materials and mechanisms for amorphous robotic construction. In *IEEE/RSJ International Conference on Intelligent Robots and Systems (IROS)*, 2012, pages 4879-4885.
[14] Justin Werfel, Kristin Peterson, and Radhika Nagpal. Designing collective behavior in a termite-inspired robot construction team. *Science Magazine*, 343:754-758, 2014.
[15] Luzius Brodbeck, Liyu Wang, and Fumiya Iida. Robotic body extension based on hot melt adhesives. In *Robotics and Automation (ICRA), 2012 IEEE International Conference on*, pages 4322-4327. IEEE, 2012.
[16] Lryu Wang, Utku Culha, and Fumiya Iida. A dragline-forming mobile robot inspired by spiders. *Bioinspiration and Biomimetics*, 9(1):016006, 2014.
[17] Quentin Lindsey, Daniel Mellinger, and Vijay Kumar. Construction of cubic structures with quadrotor teams. *Robotics: Science and Systems*, 2011.
[18] Jan Willmann, Federico Augugliaro, Thomas Cadalbert, Raffaello D'Andrea, Fabio Gramazio, and Matthias Kohler. Aerial robotic construction towards a new field of architectural research. *International journal of architectural computing*, 10(3):439-460, 2012.
[19] Motion Systems Vicon. Vicon, August 2013.

[20] Inkyu Sa and Peter Corke. System identification, estimation and control for a cost effective open-source quadcopter. In *IEEE International Conference on Robotics and Automation (ICRA)*, 2012, pages 2202-2209.

[21] Adam Braithwaite and Mirko Kovac. An extensible on-board flight control system for the quadcopter platform. *In review*, 2014.

The invention claimed is:

1. A method of using an aerial device capable of controlled flight that comprises a lift generator and a suspension device, the method comprising:
   providing lift to the aerial device with the lift generator;
   controlling the lift generator so as to controllably fly the aerial device relative to a supporting structure;
   retractably deploying, by the suspension device, an elongate flexible member by a controllable length, the elongate flexible member configured to hang the aerial device from a supporting structure;
   attaching the deployed elongate flexible member to the supporting structure;
   hanging the aerial device from the supporting structure using the elongate flexible member; and
   detaching, by the suspension device, the aerial device from at least a portion of the elongate flexible member, thereby releasing the aerial device from the supporting structure.

2. The method claim 1, wherein retractably deploying the elongate flexible member comprises spooling and/or despooling the elongate flexible member.

3. The method of claim 1, wherein the elongate flexible member comprises a hooking member for attaching the elongate flexible member to the supporting structure.

4. The method of claim 1, wherein hanging the aerial device to the supporting structure using the suspension device comprises freely suspending the aerial device from the supporting structure with the suspension device and the elongate flexible member.

5. The method of claim 1, further comprising:
   operating at least one of the lift generator and the suspension device so as to release the aerial device from its suspension from the supporting structure.

6. The method of claim 5, further comprising:
   controlling the lift generator so as to controllably fly the aerial device relative to the supporting structure, thereby releasing the suspension device from the supporting structure.

7. The method of claim 5, wherein the method further comprises:
   deploying the full length of the elongate flexible member such that the aerial device detaches from the elongate flexible member, thereby releasing the aerial device from its suspension from the supporting structure.

8. The method of claim 1, wherein the method further comprises:
   severing the elongate flexible member so as to release the aerial device from its suspension from the supporting structure.

9. The method of claim 1, wherein the method further comprises:
   controlling, during suspension of the aerial device from the supporting structure, a vertical distance between the aerial device and the supporting structure by controlling the length of the elongate flexible member deployed by the suspension device.

10. The method of claim 1, wherein the aerial device further comprises one or more sensors for generating sensor data of a surrounding environment in which the aerial device is controllably flown, and wherein controllably flying the aerial device comprises processing the sensor data of the surrounding environment.

11. The method of claim 10, wherein the one or more sensors comprise at least one camera.

12. The method of claim 1, wherein the lift generator comprises at least one propeller.

13. The method of claim 1, wherein the aerial device further comprises an energy storage device, and wherein the method further comprises recharging the energy storage device.

14. The method of claim 13, wherein recharging comprises using one or more solar panels of the aerial device.

15. An aerial device capable of controlled flight, comprising:
   a lift generator for providing lift to the aerial device;
   a suspension device for hanging the aerial device from an object; and
   a processor configured to:
      control the lift generator so as to controllably fly the aerial device relative to a supporting structure;
      operate the suspension device to retractably deploy an elongate flexible member by a controllable length; and
      operate the suspension device to hang the aerial device from the supporting structure using the elongate flexible member; and
      cause the aerial device to detach from at least a portion of the elongate flexible member, thereby releasing the aerial device from the supporting structure.

16. The aerial device of claim 15, further comprising one or more sensors for generating sensor data of a surrounding environment in which the aerial device is controllably flown.

17. The aerial device of claim 15, further comprising an energy storage device for providing power to the aerial device.

18. The method of claim 1, further comprising securing the suspension device to the supporting structure.

19. The method of claim 1, further comprising controlling the lift generator to cease providing lift to the aerial device while hanging the aerial device from the supporting structure with the suspension device.

20. The method of claim 15, wherein the processor is configured to operate the suspension device to secure the elongate flexible member to the supporting structure.

21. The method of claim 15, wherein the processor is configured to operate the suspension device to control the lift generator to cease providing lift to the aerial device while the aerial device hangs from the supporting structure by the elongate flexible member.

* * * * *